(12) United States Patent
Loe et al.

(10) Patent No.: US 12,452,625 B2
(45) Date of Patent: Oct. 21, 2025

(54) USING GEOFENCE-BASED VEHICLE LOCATION ESTIMATION TO IMPROVE QUEUING OF VEHICLES AT PREDETERMINED LOCATIONS

(71) Applicant: The City and County of San Francisco, San Francisco, CA (US)

(72) Inventors: Humphrey Loe, San Francisco, CA (US); David Morales, San Francisco, CA (US); Angus Davol, San Francisco, CA (US); Kimberly Villalobos, San Francisco, CA (US); Aayush Bhandari, San Francisco, CA (US); Sanjay Mehta, San Francisco, CA (US)

(73) Assignee: The City and County of San Francisco, San Francisco, CA (US)

( * ) Notice: Subject to any disclaimer, the term of this patent is extended or adjusted under 35 U.S.C. 154(b) by 436 days.

(21) Appl. No.: 18/062,403

(22) Filed: Dec. 6, 2022

(65) Prior Publication Data

US 2024/0187817 A1 Jun. 6, 2024

(51) Int. Cl.
*H04W 4/021* (2018.01)
*H04W 4/12* (2009.01)

(52) U.S. Cl.
CPC ............ *H04W 4/021* (2013.01); *H04W 4/12* (2013.01)

(58) Field of Classification Search
CPC ......... H04W 4/021; H04W 4/12; H04W 4/44; G06Q 10/02; G06Q 50/40; G06Q 50/47; G08G 1/144; G08G 1/146; G08G 1/149; G08G 1/202; G08G 1/207
USPC ......................................... 455/456.3
See application file for complete search history.

(56) References Cited

U.S. PATENT DOCUMENTS

| | | | |
|---|---|---|---|
| 2020/0342418 A1* | 10/2020 | Zatta | G06Q 10/06316 |
| 2021/0095982 A1* | 4/2021 | Kahn | G01C 21/362 |
| 2023/0104853 A1* | 4/2023 | Bohannon | H04W 12/068 379/209.01 |
| 2023/0316159 A1* | 10/2023 | Bishoff | H04W 4/021 705/5 |
| 2024/0169841 A1* | 5/2024 | Takahashi | G06Q 10/02 |
| 2024/0412641 A1* | 12/2024 | Marco | G06Q 30/0202 |

* cited by examiner

*Primary Examiner* — Hirdepal Singh
(74) *Attorney, Agent, or Firm* — Dergosits & Noah LLP; Igor Shoiket

(57) ABSTRACT

Location-based virtual queuing of vehicles is described. A request to join a virtual queue may be received from a user application. In response to receiving the request, the server may determine, using a geo-fencing feature, if the user computing device running the user application is within a first predetermined distance of a queue location, where the queue location is a destination of the requesting user vehicle. Then, in response to receiving confirmation that the requesting vehicle user is within the first predetermined distance, the server may automatically create and add a reservation message to a data structure that includes a plurality of reservation messages. Also, in response to the creating the reservation message, the server may provide the requesting user application a notification with the position within a queue managed by the data structure and an estimated wait time that is generated using information stored within the data structure.

30 Claims, 23 Drawing Sheets

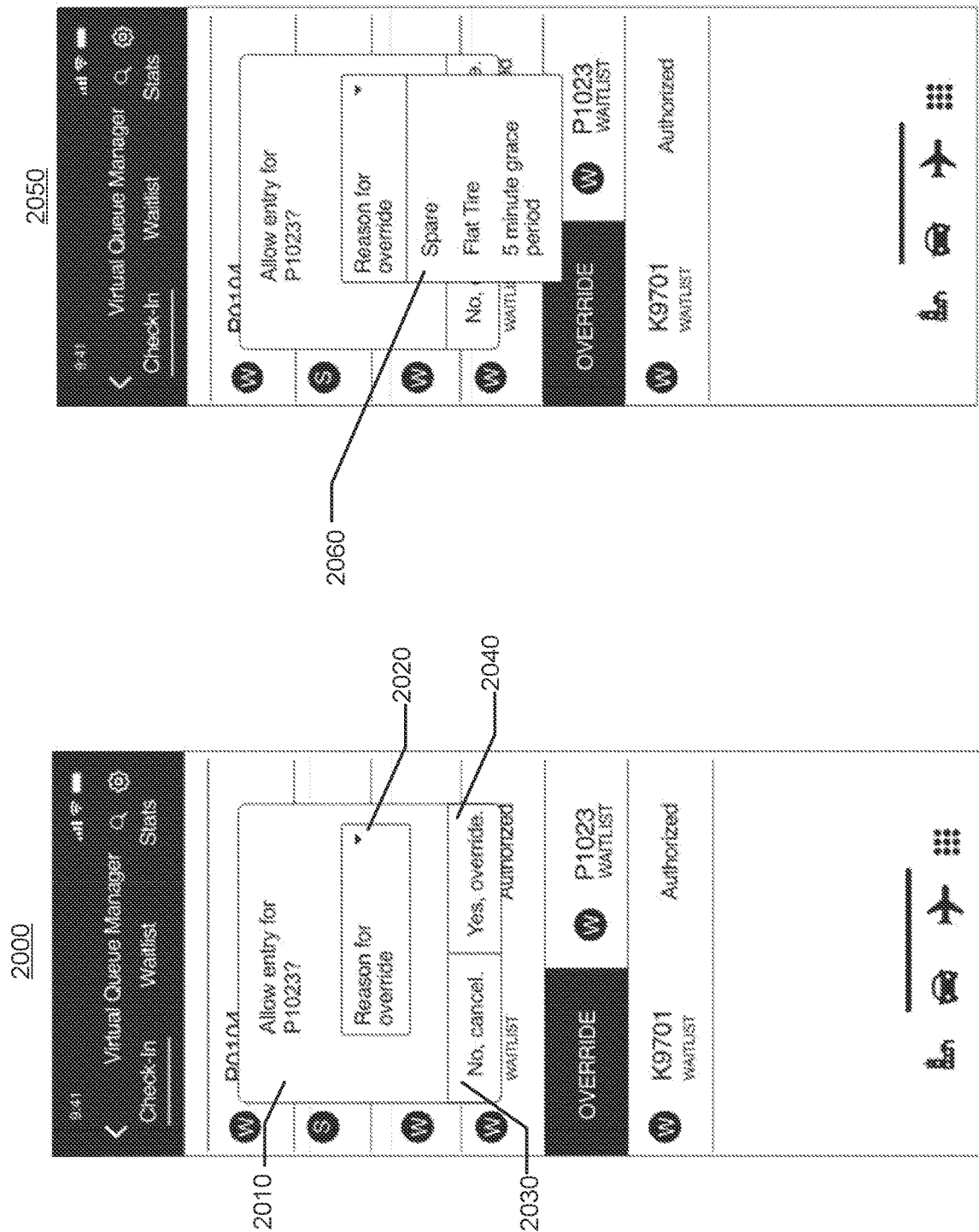

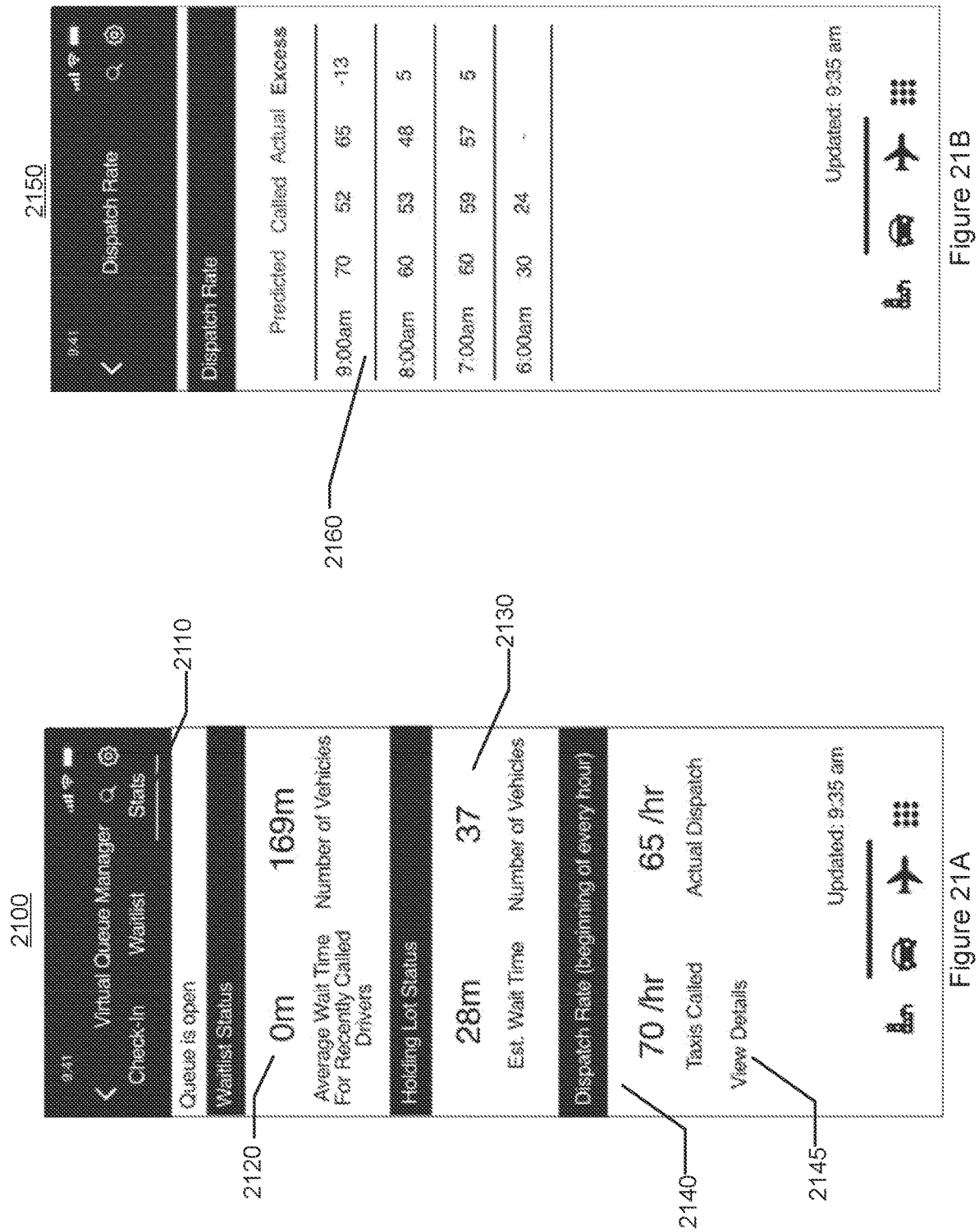

USING GEOFENCE-BASED VEHICLE LOCATION ESTIMATION TO IMPROVE QUEUING OF VEHICLES AT PREDETERMINED LOCATIONS

FIELD OF THE INVENTION

The present invention relates to the field of information technology, including, more particularly, to systems and techniques for automatically managing vehicle availability at a predetermined location based on geolocation-based tracking of the vehicles and user preferences.

BRIEF SUMMARY OF THE INVENTION

Systems and methods for location-based virtual queuing of vehicles are described. A server may receive, over a network connection, a request to join a virtual queue that includes a plurality of user requests. The request may be received from a user application operating on a user computing device, and may be associated with a requesting user associated with a vehicle. In response to receiving the request to join the virtual queue, the server may determine, using a geo-fencing feature, if the user computing device is within a first predetermined distance of a queue location, where the queue location is a destination of the requesting user vehicle. Then, in response to receiving confirmation that the requesting vehicle user is within the first predetermined distance, the server may automatically create a reservation message associated with the requesting vehicle user. The reservation message may be added to a data structure stored on the server comprising a plurality of reservation messages, which may also be referred to as a wait list data structure. Also, in response to creating the reservation message associated with the requesting vehicle user, the server may provide the requesting vehicle user with a notification, via the user application over the network connection. The notification may include a position within a queue managed by the data structure and an estimated wait time that is generated using information stored within the data structure (e.g., how many other reservation messages are in the queue, and estimated times of arrival of vehicles associated with the other reservation messages ahead in the queue of the reservation message for the requesting user vehicle).

Other objects, features, and advantages of the present invention will become apparent upon consideration of the following detailed description and the accompanying drawings, in which like reference designations represent like features throughout the figures.

BRIEF DESCRIPTION OF THE FIGURES

FIGS. 20A-B are screenshots from a mobile application displaying an interface for allowing an override of an invalidated reservation, according to various embodiments.

FIGS. 21A-B are screenshots from a mobile application displaying various metrics generated by a back-end system for display, according to various embodiments.

DETAILED DESCRIPTION

The municipal transit authority of a city typically governs the operation of taxis within city limits with exceptions at the city's municipal airport. Airports grant permits to municipal taxis to pick up arriving passengers under a set or permit rules that can include taxi parking, passenger pick up locations and required fees, not including the fare, to pick up a passenger. Airports provide several slots in parking garages or surface lots to create a holding lot for taxis. The operating cost of the holding lot may be financed by the pick-up fee assessed to the drivers executing a pick-up. The operation attempts to maintain an adequate taxi supply to meet passenger demand for curbside pickups with minimal passenger wait time. An unmediated, first-in, first out process for supplying and dispatching taxis from these holding lots to roadway curbsides can lead to inefficiencies in the operation, resulting in long wait-times for taxi drivers to be dispatched and mismatched utilization of space resources causing oversupply.

The use of a virtual queue (VQ) described herein, a digitally, managed wait list for vehicle reservation messages corresponding to vehicles for a queue location, can be used to improve the efficiency of an operation by managing vehicle supply to meet current demand. The VQ may use geofence and temporal rules to enforce operational compliance. A more efficient operation can incentivize drivers to work at airports if their holding lot wait times can be reduced to reasonable levels, allowing them to work in the downtown center when they are not needed at the airport. Oversupply can be mitigated by having an adequate number of drivers at the airport when demand is present, usually correlated with the airport's arrival flight schedule, which can reduce the size of the holding lot. The recovered slots can be used for the parking public, generating additional parking revenue for the airport.

Figure 1:
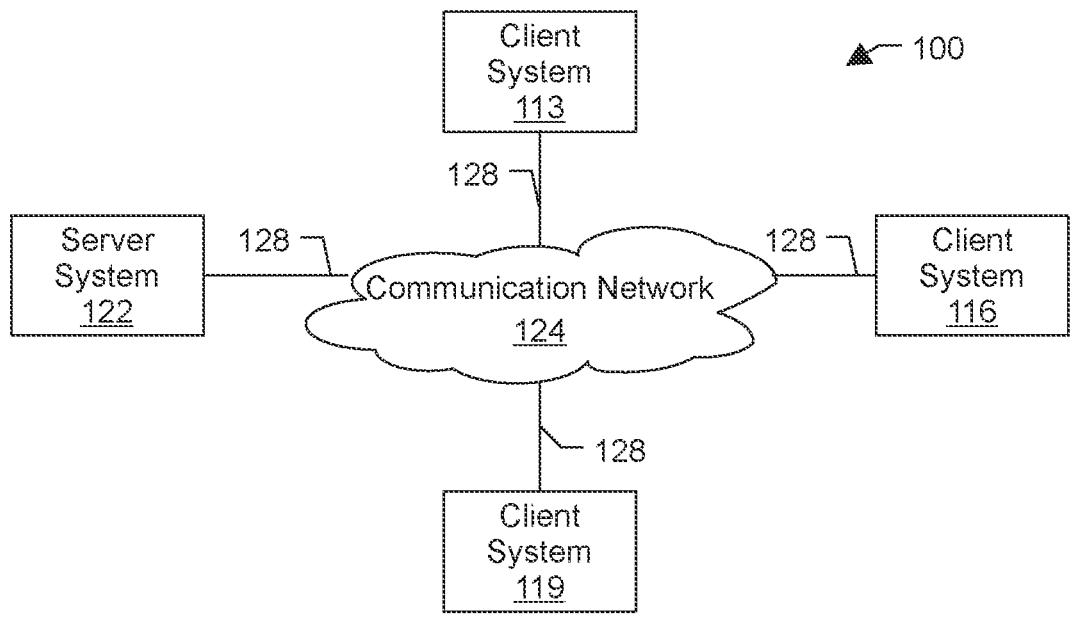
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others. In other embodiments, a native mobile application may be used to select, access, retrieve, or query the information stored by server system 122.

Figure 2:
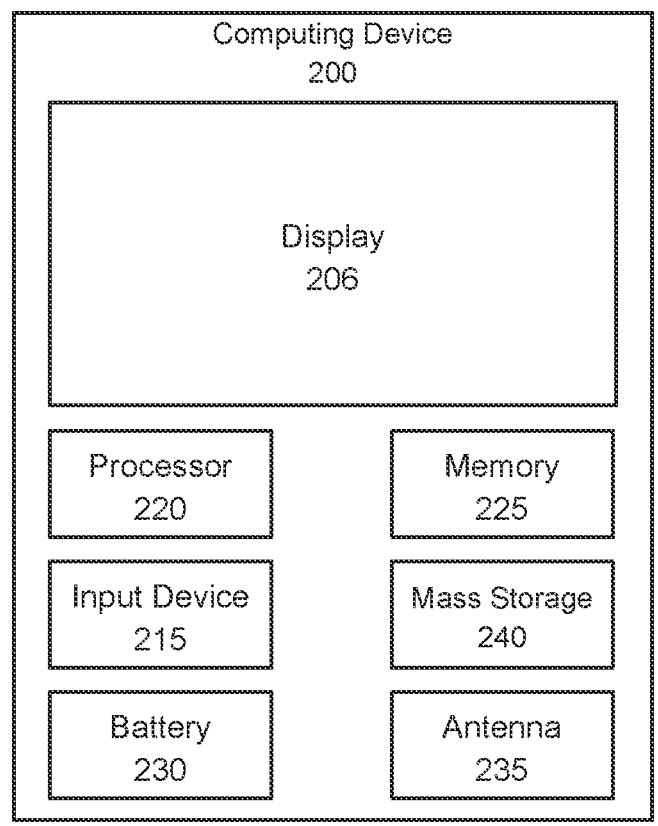
FIG. 2 shows block diagram of an exemplary mobile computing device according to an embodiment.

FIG. 2 shows a specific embodiment of a computing device 200 such as a mobile client system of the present invention, which may be an example of one of the client systems 113, 116, and 119 of FIG. 1. In an embodiment, a user interfaces with the system through a client system, such as shown in FIG. 2. Mobile client communication or portable electronic device 200 includes a display, screen, or monitor 206 and an input device 215 within a single housing. The housing may also include familiar computer components, some of which are not shown, such as a processor 220, memory 225, battery 230, speaker, transceiver, global positioning system (GPS) receiver, antenna 235, microphone, ports, jacks, connectors, camera, input/output (I/O) controller, display adapter, network interface, mass storage devices 240, and the like and various combinations thereof. These components may be connected using any interconnection scheme or bus architecture.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or a combination of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The invention may also be used with computer systems having different configurations, e.g., with additional or fewer subsystems. For example, a computer system could include more than one processor (i.e., a multiprocessor system, which may permit parallel processing of information) or a system may include a cache. The computer system shown in FIG. 2 is but an example of a computer system suitable for use with the present invention. Other configurations of subsystems suitable for use with the present invention will be readily apparent to one of ordinary skill in the art.

For example, in a specific implementation, the computing device is a mobile communication device such as a smartphone or tablet computer. Some specific examples of smartphones include the Droid Incredible and Google Nexus One, provided by HTC Corporation, the iPhone® or iPad®, both provided by Apple Inc., and many others. Typically, these mobile or portable computing devices have less resources (e.g., memory, storage, smaller screens, or processing power) than a desktop computer. Further, such mobile or portable computing devices are designed to be powered primarily by a battery, rather than being constantly plugged in to a power outlet as in the case of a desktop computer. So, given these differences between portable and non-portable computing devices, it is generally desirable that applications on portable computing devices be small and lightweight (e.g., consume relatively fewer resources as compared to non-portable computing devices). The computing device may be a laptop or a netbook. In another specific implementation, the computing device is a non-portable computing device such as a desktop computer or workstation.

A computer-implemented or computer-executable version of the program instructions useful to practice the present invention may be embodied using, stored on, or associated with non-transitory computer-readable medium. Non-transitory computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present invention may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the invention may be transmitted via wires, radio waves, or through a network such as the Internet. In another specific embodiment, a computer program product including a variety of software program code to implement features of the invention is provided.

Computer software products may be written in any of various suitable programming languages, such as C, C++, C #, Pascal, Fortran, Perl, Matlab® (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android® system, iPhone® OS (i.e., iOS®), Symbian®, BlackBerry OS, Garnet OS, webOS, Mer, Maemo®, Tizen®, or BREW® OS. An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the mobile device or portable computer device may be connected to a network and may interface to other computers using this network. The network may be an intranet, internet, or the Internet, among others. The network may be a wired network (e.g., using copper), telephone network, packet network, an optical network (e.g., using optical fiber), mobile network, or a wireless network, or any combination of these. For example, data and other information may be passed between the mobile device or portable computer and components (or steps) of a system useful in practicing the invention using a mobile network employing a protocol such as code division multiple access (CDMA), Global System for Mobile Communications/General packet radio service (GSM)/(GPRS), Worldwide Interoperability for Microwave Access (WiMAX), or 3GPP Long Term Evolution (LTE) or a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers, or from mobile communications devices to other mobile communications devices.

Figure 3:
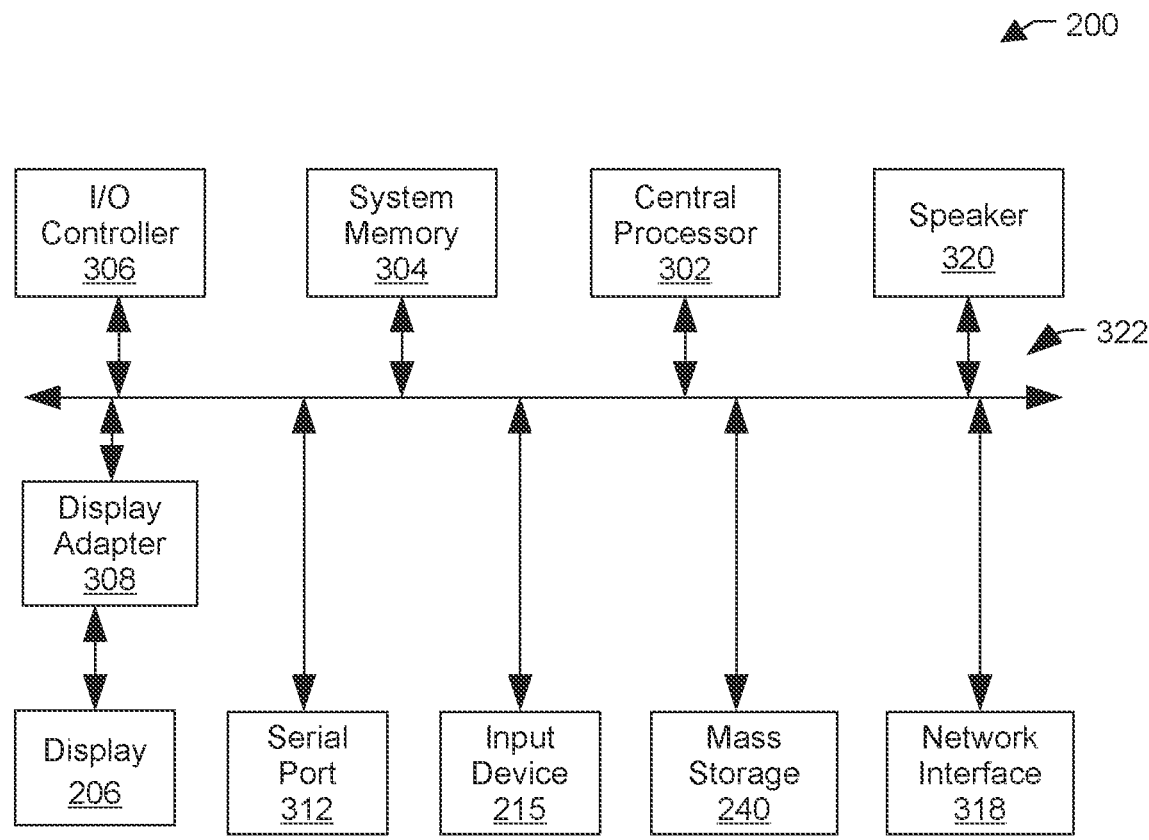
FIG. 3 shows a system block diagram of a mobile computing device, according to an embodiment.

FIG. 3 shows a system block diagram 300 of mobile computing device 200. As in FIG. 2, computer system 200 includes display 206, input device 215, and mass storage devices 240. System diagram 300 further shows subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 200. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 200 shown in FIG. 2 is but an example of a suitable computer system. Other configurations of subsystems suitable for use will be readily apparent to one of ordinary skill in the art.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource locators (URLs) to identify resources on the Web and hypertext transfer protocol (HTTP) in transferring files on the Web.

Figure 4:
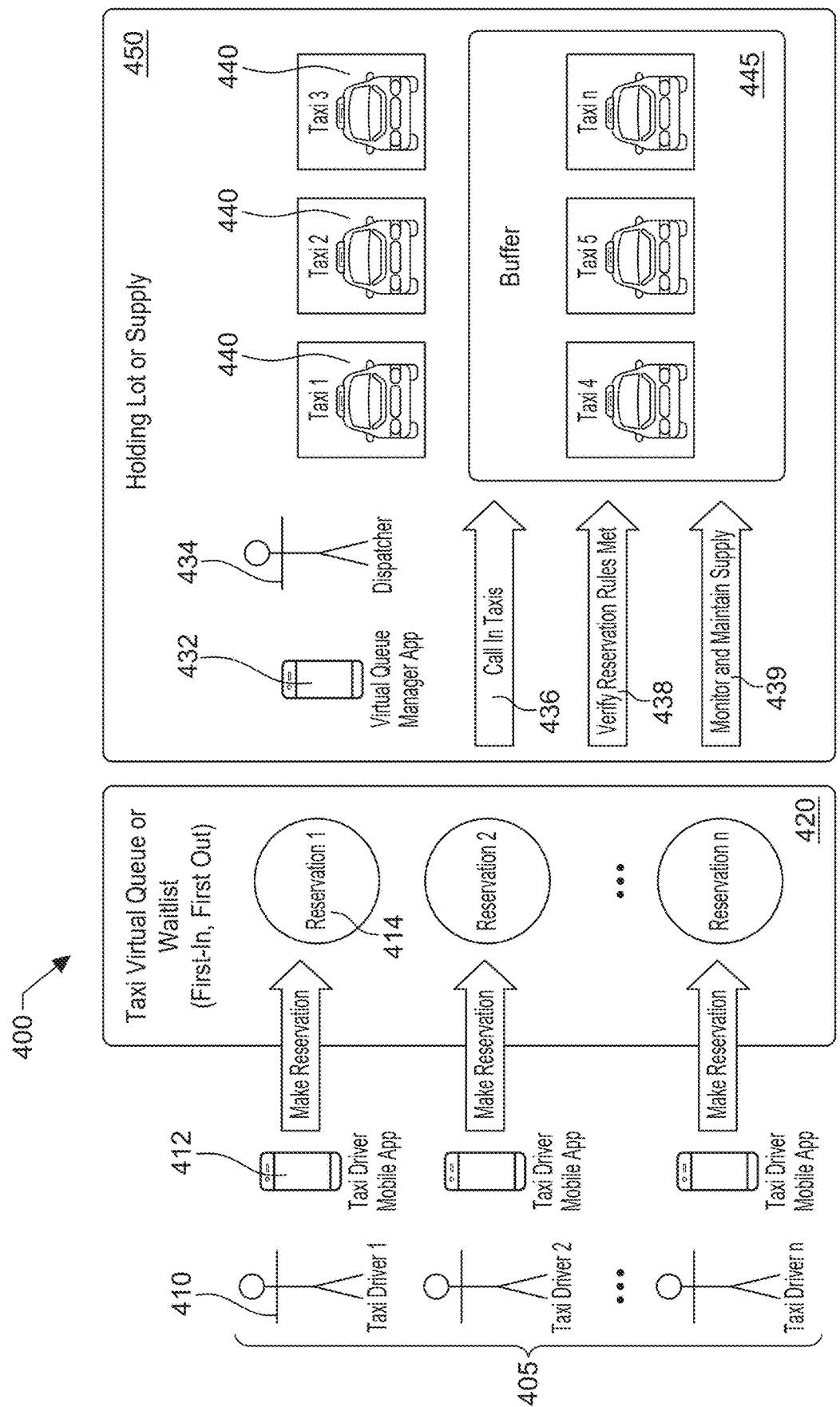
FIG. 4 shows a simplified block diagram of an operating environment incorporating a system for location-based virtual queuing of vehicles, according to an embodiment.

FIG. 4 shows a simplified block diagram of an operating environment incorporating a system 400 for location-based virtual queuing of vehicles, according to an embodiment. The environment may include VQ 420, which may be implemented as a data structure on a server, in communication with a plurality of driver mobile applications 412, each mobile application operating on a mobile computing device associated with drivers 405, presumably on location with their vehicles. VQ 420 server may also be in communication with virtual queue manager application (VQM) 432 operated by dispatcher 434 at queue location 450, which may be a holding lot or supply as shown. As shown, VQ 420 may be implemented as a first-in, first-out queue, though other alternatives may be utilized (e.g., based on driver seniority, or by a taxi company, or any other data stored by the driver mobile application 412.

Taxi drivers 405 participating in the VQ (also referred to as the "Wait List" herein) may be required by permit to adhere to one or more rules to join the VQ 420. For example, drivers 405 may be required to be registered with the municipal taxi authority as a commercial, taxi operator. Another rule may require that the taxi vehicle associated with drivers 405 be registered with the municipal taxi authority as a commercial, permitted vehicle. A third rule may require the drivers 405 to be associated with a vehicle with a valid medallion for commercial operation. Each of these permits and registrations may be stored in the mobile application 412, and be transmitted when the mobile application 412 makes a request to join the VQ 420.

In system 400, reservations are made to be placed on the VQ 420 by the mobile applications, identified as Taxi Driver Mobile Applications (TDMAs) 412 in the system 400. In the exemplary embodiment, reservations are added to the wait list on a first in, first out (FIFO) basis. A reservation may be accepted when the requirements to join the VQ 420 are met. The requirements may include, for example, rules requiring that the location of the requesting mobile device at the time of placing the reservation be in an allowed geofence, and that the VQ 420 be in an active state. The driver 410 associated with the request to join the VQ 420, indicated as reservation 414 in the VQ 420, may be notified of their position on the wait list via the TDMA 412. The geofence may be designated to prevent taxi driver 410 from making a reservation if they are too close to the airport, to prevent staging or loitering in a nearby community. The geofence may also be designated to prevent taxi driver 410 from making a reservation if they are too far from the airport, to prevent behaviors that can lead to speeding to make the time limits for entering the queue location.

Distance factors may be used in the design of geofences that allow drivers to meet time limits that are adjusted based on current traffic conditions and roadway speed limits. For example, using current traffic conditions such as the roadway speed from a third-party traffic monitoring data service could be used to calculate an estimated time to reach the queue location from various locations. The temporal service level agreement requirement (SLA) can accordingly be dynamically adjusted based on the traffic conditions (e.g., to allow for more time when traffic conditions are high, instead of a predetermined amount for normal non-high traffic conditions). Likewise, a dynamic geofence boundary could be extended to be further from the queue location if traffic conditions allow for safe driving conditions when vehicle congestion is low on the roadway.

A taxi driver is allowed a specific amount of time to respond to a call-in event 436 issued by using the VQM 432. By confirming the call-in, the driver is asserting that they will come to the queue location to pick up a passenger, and the reservation 414 is then taken off the VQ 420. A reservation may be invalidated if the taxi driver violates a SLA by not confirming a call-in or exceeding the response time for a call-in. The SLA may be required for all drivers 405 using the TDMAs 412. The TDMA may require an acceptance of the Terms of Service Agreement (TSA) upon the initial use of the application. Acknowledgement may be logged in perpetuity while the driver participates in the program or until a new TSA is required due to changes in the operating permit. The invalidated reservation may be removed from the wait list 420 in response to a response to a call-in event not being received by the VQM 432 within the time period specified by the TSA.

Figures 5A, 5B, 5C:
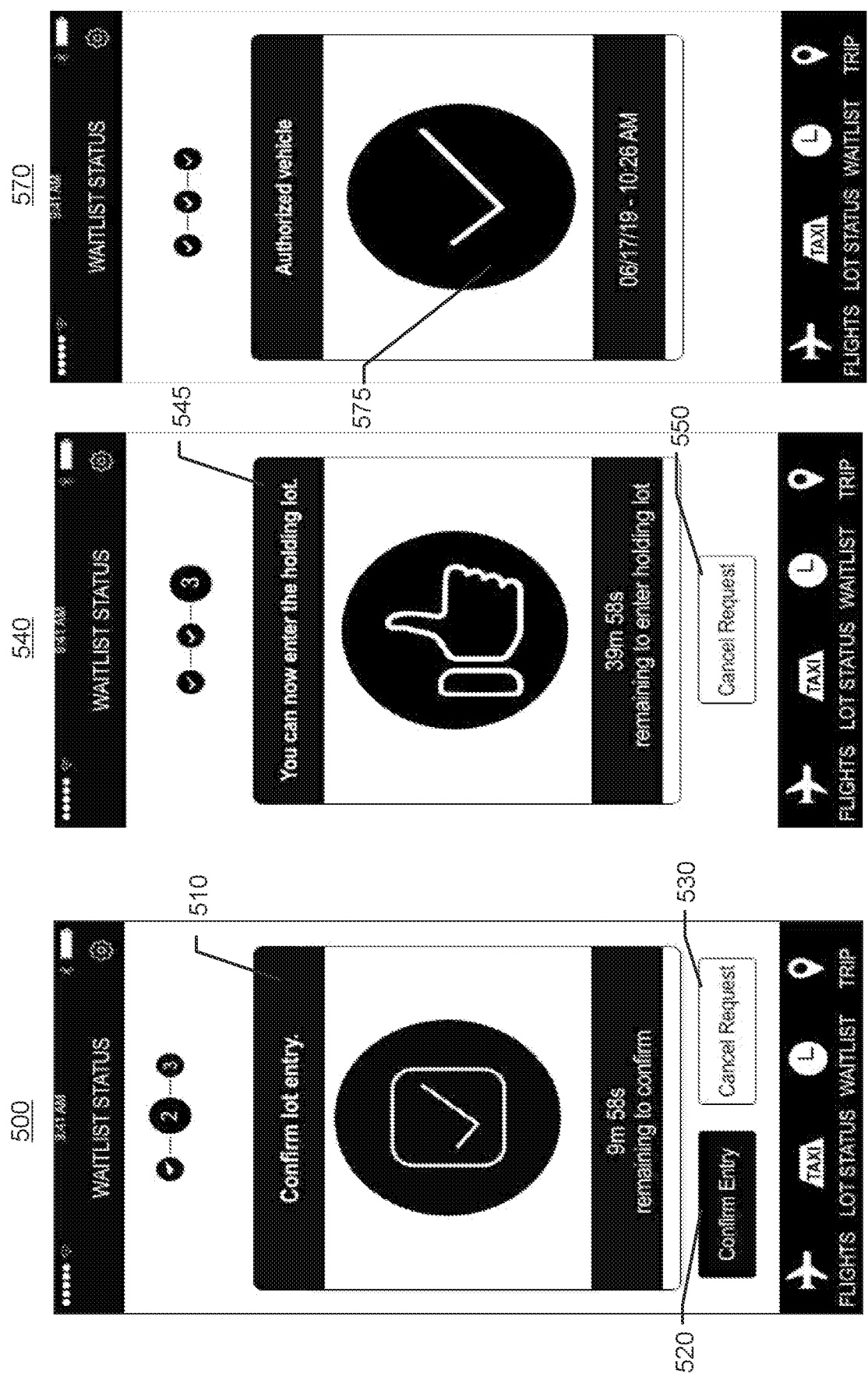
FIGS. 5A-C are screenshots from a mobile application displaying a notification to proceed to the physical queue location, acknowledging confirmation of receipt, and verification of arrival at the queue location respectively, according to various embodiments.

A taxi driver is allowed a specific amount of time to reach the airport's holding lot after responding to the call-in event 436. FIG. 5A is a screenshot of an interface 500 from a mobile application displaying a notification to proceed to the queue location, according to various embodiments. If the driver is viewing the GUI 500 the message to confirm a call in 510 is displayed. The driver has ten minutes in the exemplary interface 500 to respond to a call-in notification. If the response is not made within the time limit, the reservation is invalidated and the driver must make a new request or reservation. The driver is provided with a selectable option 520 to confirm entry into the queue location and a selectable option 530 cancel the request to enter the queue location. On the back-end system, the Reservation Management component (described in greater detail below) may update the state of the reservation to reflect that a call-in was made to the driver. A State Management component may send a message to update the GUI of the TDMA to display interface 500, and a Monitoring component of the back-end system may start the ten-minute SLA timer for call confirmation.

When the call-in request is confirmed, then interface 540 from the TDMA 412 in FIG. 5B may be caused to be displayed by the back-end server. Interface 540 includes message 545 to confirm arrival at the queue location within a predetermined time limit that is tracked by one or both of the TDMA 412 and the back-end server managing the VQ 420. The driver has forty minutes in the exemplary interface 540 to respond to a call-in notification. If the response is not made within the time limit, the reservation is invalidated and the driver must make a new request or reservation. The driver is also provided with a selectable option to cancel the reservation 550. On the back-end system, the Reservation Management component may update the state of the reservation to reflect that the driver confirmed, via the TDMA 412, the call-in request made by the back-end system. The State Management component may send a message to update the GUI of the TDMA to display interface 540, and a Monitoring component of the back-end system may start the forty-minute SLA timer to arrive at the queue location. If the vehicle reaches the pre-validation geofence within the time required, the driver and vehicle is authorized to enter the queue location 450 in response to a verification 438 that the reservation rules have been met when the vehicle reaches the holding lot 450. In response to reaching the pre-validation geofence, the back-end server may cause interface 570 to be displayed on the interface of the driver, which includes message 575 stating that entry at the queue location was authorized. On the back-end system, the business rules engine may evaluate relevant rules to validate the reservation, and the Location component may confirm that the vehicle has reached the pre-validation geofence. The Reservation Management component of the back-end system may update the state of the reservation to reflect that the driver passed all validations, and the State Management component may send a message to update the GUI of the TDMA to display interface 570.

By contrast, a reservation is invalid if the taxi driver does reach the pre-validation geofence within the required time limit. This SLA may be required and documented in the TSA of the TDMA 412. The invalidated reservation may be removed from the wait list 420 in response to identifying that no response has been received in a predetermined amount of time after receiving the response to the call-in event 436. The driver can continue to the holding lot 450 as an unauthorized vehicle and contest the missed SLA. The dispatcher 434 in the holding lot 450 has the discretion to override the invalid reservation and allow driver entry. A taxi driver may also cancel a reservation at any time that the reservation is on the wait list. A driver must make a new reservation if they cancel a reservation or if the reservation is invalid due to missed SLAs.

A dispatcher 434 managing the occupancy of the physical holding lot 450 acts as the manager of the VQ 420 and uses VQM 432. The dispatcher 434 can enable and disable the VQ 420 to accept reservations, and can call vehicles from the VQ 420 to the queue location 450 at their discretion. The dispatcher 434 may issue a call-in event 436 requesting a specific number of taxi drivers from the VQ 420 to maintain a supply of vehicles in the holding lot to meet passenger demand. The dispatcher 434 can manage the quantity of vehicles and frequency of call-ins at their discretion. The vehicles 440 may be called in sequential order based on their position in the VQ 420 using a FIFO protocol, where the reservations with the earliest timestamps are prioritized. While the embodiment shown in system 400 may use FIFO protocol, other organization methods may be used (e.g., priority based on predetermined tiers, historical queueing data for individual users, etc.). Moreover, exceptions may be built into the calling sequence, such as giving priority to vehicles that are ramp accessible despite the ramp accessible vehicles being later in time than other reservations in the VQ 420. The dispatcher 434 may perform a check-in 438 of arriving vehicles into the holding lot 450, verifying that the reservation rules have been met before allowing the arrived vehicle into the holding lot 450. The reservation rules may include, for example, verifying that the medallion number on the vehicle matches the medallion on the reservation.

The dispatcher 434 can accept, reject, or override the reservation upon the vehicle's entry into the holding lot based on the history of the reservation. If the reservation is rejected, the driver must exit the holding lot. Otherwise, they are granted entry into the holding lot. The VQM 432 may manage the operation using predetermined operational hours are based on a daily schedule set by the holding lot 450. Reservations in the VQ 420 may be accepted during the VQ's operational hours, and during non-operational hours reservations may be denied access to the VQ 420. All reservations that remain on the VQ 420 when the VQ 420 is closed at the end of the day's operating hours are invalid and flushed from the VQ 420 prior to the next day's operating hours, in some embodiments. The VQ 420 can be paused during operational hours, disabling the capability for the driver 410 using TDMA 412 to make a reservation. The VQ 420 can also be suspended during operating hours, allowing taxi drivers to enter the holding lot 450 without a reservation. Drivers who were on the VQ 420 at the time of queue suspension are all called in simultaneously and the SLAs are ignored. Driver reliability is measured by the system using data from reservations including cancelations, invalidations due to missed SLAs and valid reservations.

Figure 6:
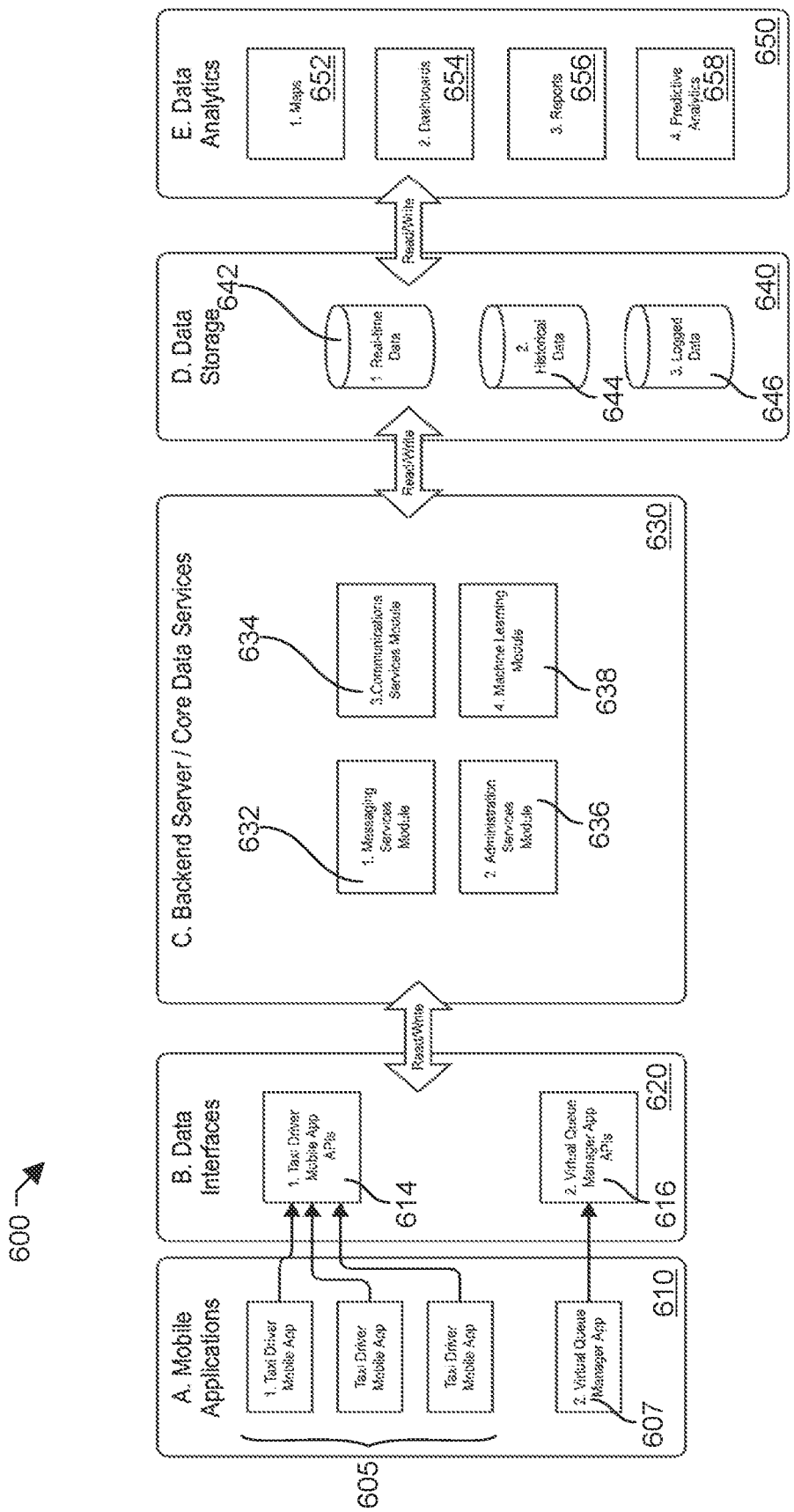
FIG. 6 shows a block diagram of a system architecture for a system for location-based virtual queuing of vehicles, according to an embodiment.

FIG. 6 shows a block diagram of a system architecture for a system 600 for location-based virtual queuing of vehicles, according to an embodiment. The system 600 may include mobile applications 610, data interfaces 620, back end server 630, data storage 640, and data analytics 650. Each of the above-listed components may be communicatively coupled to each other via a network connection (i.e. using a local network or a remote network, such as the Internet). The mobile applications 610 may include TDMAs 605 and VQM 607, which may run on the Apple iOS and Google Android platforms as noted above. The user interfaces of TDMAs 605 and VQM 607 provide the functionality for each user to interact with the system 600 to fulfill their roles in the operations for providing ride services to customers. Each TDMA 605 may be used by drivers to participate in taxi operations at a queue location. The user can make and cancel reservations via TDMA 605. The VQM Application 607 may be used by staff operating a municipal facility to enable and support operation of a VQ for the facility. The VQM Application 607 supports two roles, supervisor and dispatcher. The dispatcher can perform operational functions to call in TDMA users (i.e., drivers), and verify, reject, and override reservations. The supervisor can perform dispatcher functions and additionally perform administrative functions such as pausing and suspending the VQ associated with the wait list, modify configuration parameters, and/or define reason codes for overrides.

The data interfaces 620 may be implemented as representational state transfer application programming interfaces (RESTful APIs), using a Secure Hyper Text Transfer Protocol (HTTPS) to allow the mobile applications 610, including TDMAs 605 and VQM Application 607, to communicate with the back-end system 630 using cellular network connectivity of the mobile computing device executing the respective application. All communications and transmissions may be encrypted via the data interfaces 620 between the mobile applications 610 and the back-end servers that form the back end system 630.

A first set of API endpoints 614 may support the operation of the TDMAs 605. The first set of APIs 614 may be integrated with the backend system 630 to perform business rule enforcement of the operations of the TDMAs 605. Similarly, a second set of API endpoints 616 may support the operation of the VQM Application 607. The APIs 614 and 616 may be used by TDMAs 605 and VQM Application 607 respectively to communicate with the core services of the backend system 630 to manage vehicle supply at the queue location and verification of SLAs for driver reservations. As discussed below, core services provided to TDMAs 605 and/or VQM Application 607 may be hosted on distributed backend servers 630, and may include messaging services 632, communications services 634, administrative services 636, and machine learning services 638. In an exemplary embodiment, VQM Application 607 may be in communication with all four core service modules 632, 634, 636, and 638 via the second set of APIs 616, while TDMAs 605 may be in communication with the messaging services 632 and communications services 634 via the first set of APIs 614.

The core services provided by the backend system 630 may include modules that are dedicated towards specific functions to manage the lifecycle workflow of the system 600. The core data services may be hosted on multiple servers designed to comply with a Separations of Concern (SOC) design philosophy in some embodiments. Messaging Services module 632 may be responsible for integrating real-time messages and events between the components of backend system 630 to maintain the proper states of a reservation's lifecycle. The coordination between backend components may be conducted to enforce the business rules of a vehicle operating permit. Permit compliance and non-compliance can be verified using data generated by driver actions on TDMAs 605 that is received by the Messaging Services module 632. State management of relevant entities may also be managed by Messaging Services module 632, including the state transitions that lead to a final state.

Communication between the mobile applications and core data services 630 may be managed using the Communication Services module 634. Communication Services module 634 may be responsible for acting as a communications gateway to send messages between the mobile applications 610 and the back-end core services 630. These messages can include:

State transitions for specific state machines maintained on any one of the mobile applications 610;

Automated acknowledgements of received messages by the mobile applications 610; and User-friendly messages displayed as part of the user interface.

User friendly messages could include: the position of the reservation within the wait list, the estimated time to expect to be on the wait list, the number of vehicles in the holding lot, and the estimated wait time in the holding lot until dispatched. The Administration Services module 636 may be responsible for managing the services that register, configure, and apply the business rules for system operation.

Machine Learning module 638 may be responsible for providing taxi demand predictions at periodic time intervals in certain embodiments. The machine learning model may be trained using historical taxi data of operations at the facility. Real-time data may be processed by the Machine Learning module 638 to consider current conditions to make taxi demand predictions in some embodiments. Historical taxi data that is used by the machine learning model can include: the number of valid reservations for a given time period, the number of canceled or invalid reservations for a given time period, the number of vehicles dispatched from the garage for a given time period, and/or the number of vehicles exiting the facility's geofence for a given time period. The output of the machine learning model may include an estimate of the number of vehicles to call in for a given time period, and/or estimated wait times for reservations on the VQ.

Multiple types of data storage 640 may be used to provide the relevant analytic functionality based on temporal needs. Real-Time Data Store 642 may contain the data that is streamed from the mobile applications 610 to the data interfaces 620 that is processed by the Messaging Service module 632. Real-Time Data Store 642 is in communication with the Messaging Service module 632. All operational data may be stored in Real-Time Data Store 642, in the form of a database in some embodiments.

Historical Data Store 644 may contain all processed data that is derived from the data stored in the Real-Time Data Store 642. The processed data may be transformed into a database 644 that can be analyzed using tools such as Structured Query Language (SQL) clients. Data aggregations can be stored in the Historical Data Store 644 for long term, e.g., year over year, or month over month analysis. Fine grain data elements within the Historical Data Store 644 can be used for training machine learning models for use in predictions and forecasting.

Logged Data Store 646 may contain meta data related to the operation of the system. These log entries describe what and when messages and events are processed by the Core Data Services. The log entries enable processes and transactions to be traced in sequential chronological order for operational and debugging purposes.

The data analytics servers 650 may retrieve data from the data stores 640 to generate interfaces that include the results of analysis of the data. Maps module 652 may generate geospatial layers, which may be placed on top of digital maps to display an individual reservation lifecycle, including all the events and locations relevant to the reservation. Additionally, data may be aggregated to provide heat maps of operational activity, for example. Visualizations on the interfaces provided by Dashboards module 654 may be used to depict operational topics of interest or Key Performance Indicators (KPIs) that can include VQ KPIs. The system 600 may be designed to increase the number of drivers participating in the program, increase the number of fares for each driver participating in the program, reduce the wait time of the driver in the facility holding lot, and reduce the number of slots in the holding lot. Each of these factors may be tracked using KPIs such as driver participation using the TDMA, users within the queue location, unique users over a predetermined time frame, etc.

Reports module 656 may be used to generate interfaces dedicated to specific, more granular topics of interest compared to the Dashboards module 654. Examples of reports which may be generated on interfaces using the Reports module 656 include daily reservations, driver calls confirmed, daily invalid reservation overrides, and predictive analytics. For example, the Reports module 656 may automatically generating a report documenting that the user device failed to meet service level requirements, such as the call-in period of time or the reporting period of time after responding to a call-in, and accordingly the reservation associated with the user device was invalidated. Predictive analytics may include data that is used to predict or forecast operational or financial metrics of interest, and/or data used by a machine learning model to improve taxi demand predictions (e.g. to use the model to anticipate demand for vehicles at a particular point in time).

Figure 7:
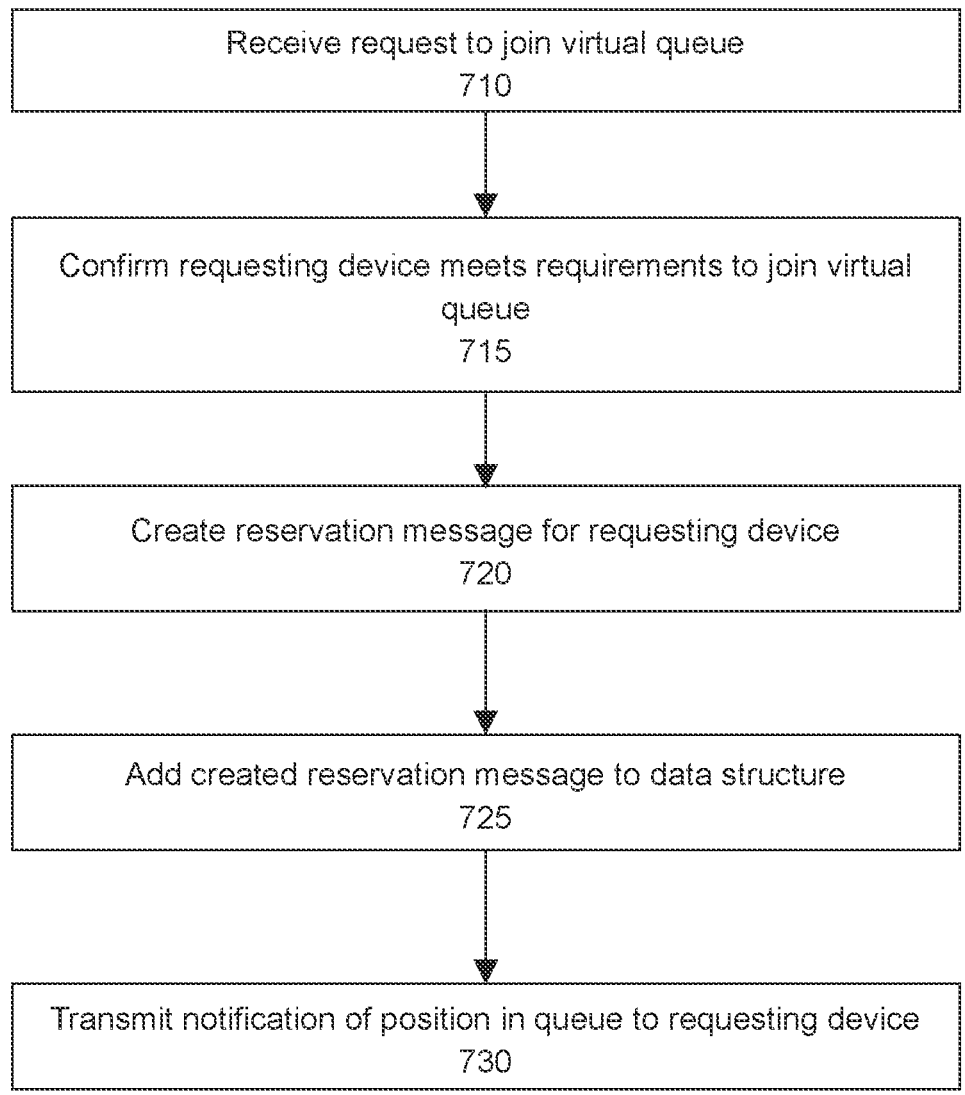
FIG. 7 shows a flow diagram of a method of location-based virtual queuing of vehicles, according to an embodiment.
Figure 8:
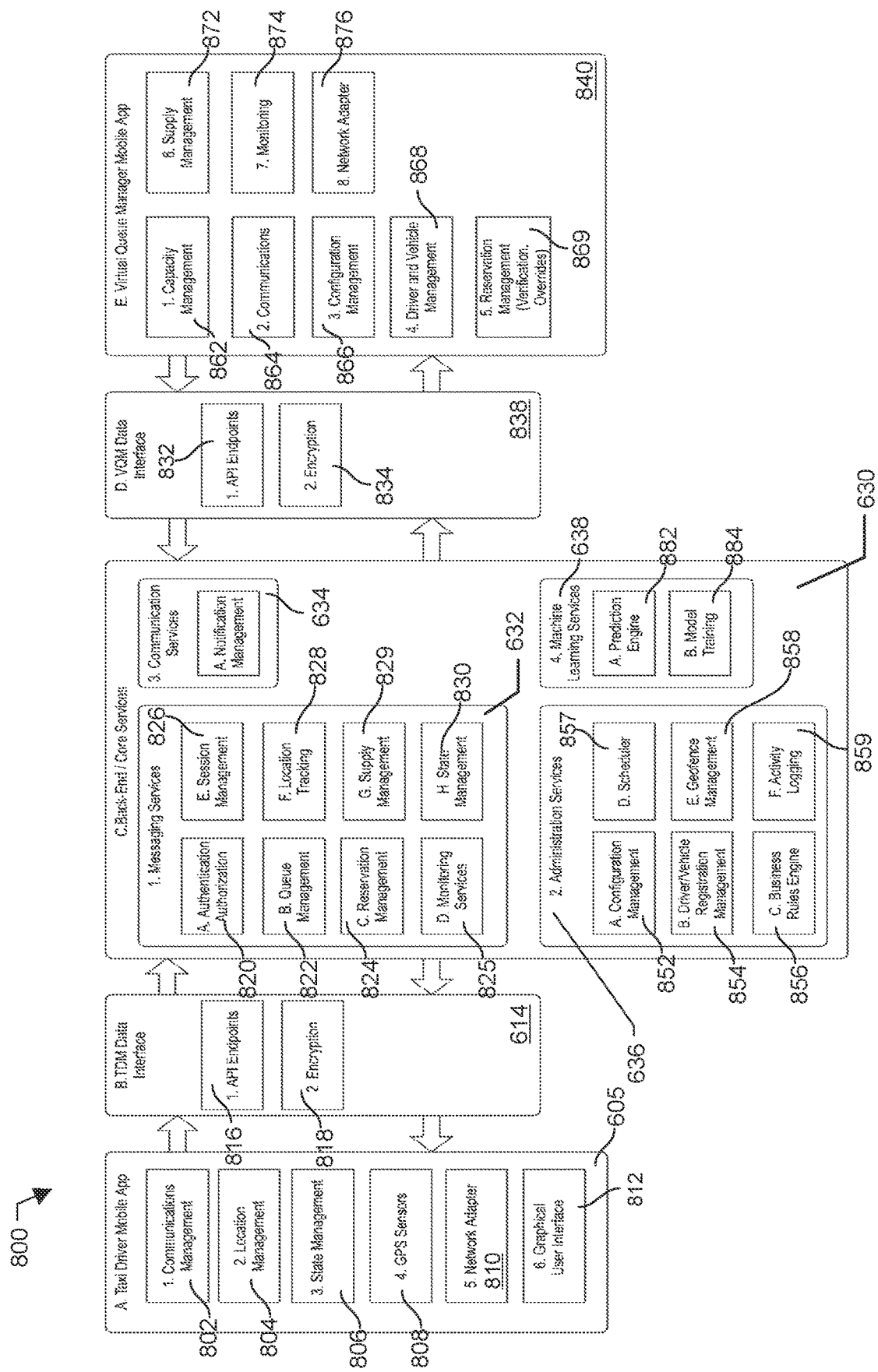
FIG. 8 shows a block diagram of a detailed system architecture including data interfaces for a system for location-based virtual queuing of vehicles, according to various embodiments.

FIG. 7 shows a flow diagram of a method 700 of location-based virtual queuing of vehicles, according to an embodiment. A processor of a computer having memory (e.g., a server of backend services 630) may receive, over a network connection, a request from a TDMA to join a VQ at step 710, where the VQ includes a plurality of user requests. The request may be received from a user application operating on a user computing device, and may be associated with a requesting user associated with a vehicle. FIG. 8 shows a more detailed block diagram of a system architecture for a system 800 for location-based virtual queuing of vehicles, according to an embodiment. System 800 may be a more detailed diagram of system 600 from FIG. 6.

As seen in system 800, exemplary TDMA 605 may include a plurality of modules. The Communications Management module 802 is responsible for maintaining communications between the TDMA and the back-end services. The Communications Management module 802 supports the following protocols. HTTPS over REST APIs, in-app messaging for iOS and Android operating systems. This module may use the Network Adapter for network transport. The Location Management module 804 may determine the location of the device based on geofences and Global Positioning System (GPS) coordinates obtained from the phone's GPS sensors. Coordinates are compared to geofences stored in the application to determine if they are within or outside of the relevant geofences. This location is reported back to the system via REST APIs along with the latitude and longitude coordinates. Location evaluation is monitored at a defined frequency. In an exemplary embodiment of the TDMA 605, the location may be evaluated and reported to the back-end system 630 every 30 seconds, though a shorter or longer interval may be used if desired.

The State Management module 806 may maintain the states of sessions, reservations, and trips. The State Management module 806 may provide information regarding the state managed by the back-end system 630 to a user via various interfaces. A "Session" may be a data entity stored on the back-end system 630 that contains driver and vehicle profiles. A valid "Session" may be required to participate in the VQ program. A "Reservation" may be the request stored in the VQ for entry to the physical queue location. A valid "Reservation" may be required for entry into the queue location. In some embodiments, a "Trip" may be a data entity that represents the journey that the driver and vehicle partake after they pick up a passenger at the queue location that may be used to enforce the "Short Trip" privilege, described below in further detail. Business rule enforcement for permit compliance is achieved by managing the states of the relevant entities through their lifecycles.

The mobile computing device running the TDMA may include hardware GPS sensors 808 to provide the latitude and longitude in a WGS84 coordinate system, according to an embodiment. Other geospatial coordinate systems may be used in other embodiments, including NAD83 or GGRS87, for example. The operating system's device driver may retrieve this data from the sensors and makes it accessible to the TDMA for further use and processing. The mobile computing device running the TDMA may also include a hardware network adapter for cellular and wi-fi protocols used by the TDMA to communicate with the back end system. The network transport layer provided by the Network Adapter 810 may allow the TDMA to send and receive data via REST APIs and to receive in-app messages from the back end. The Graphical User Interface (GUI) 812 is the visual and interactive interface provided to the taxi driver to enable the necessary functionality to participate in the program. Reservations can be made, cancelled, or fulfilled based on the actions of the taxi driver. After the driver exits the holding lot, the GUI provides the interface to manage the short trip program once a passenger is picked up from the curbside, discussed in greater detail below.

The request to join the VQ may be routed to back-end system 640 via TDMA data interface 614. The TDMA data interface 614 may include, as shown, a set of REST APIs 816, including specific endpoints relevant to the TDMA. The TDMA data interface 614 may also encrypt messages between TDMA 605 and the back-end services 630 using Encryption module 818. Encryption module 818 may encrypt communications with the following protocols: Transport Layer Security (TLS) implemented using HTTPS. Using a TLS Certificate issued by a certificate authority, the server's identity can be verified, which verifies the communications are from the origin server and not from a "man in the middle" attack.

Figure 9:
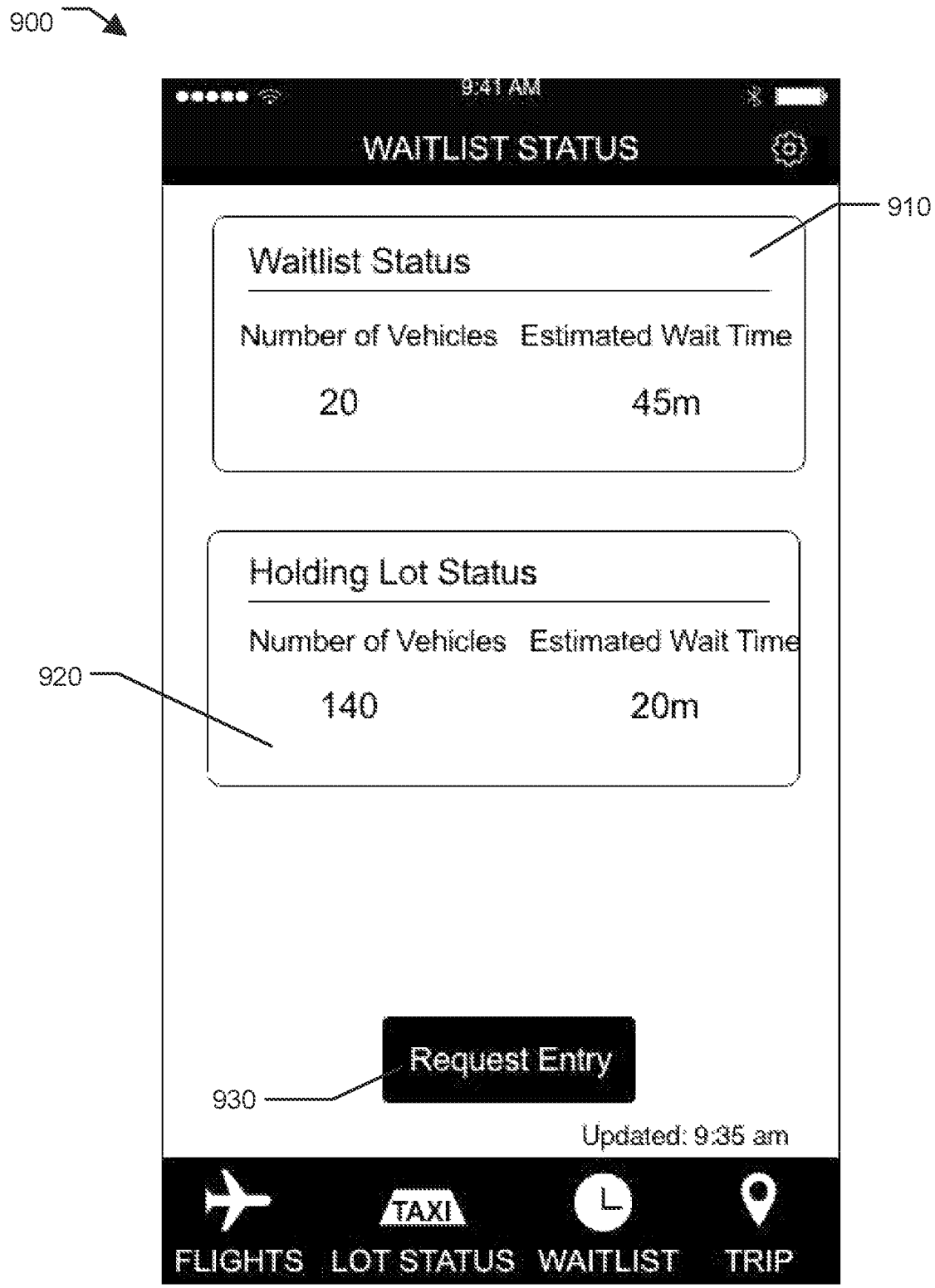
FIG. 9 is a screenshot from a mobile application prior to joining the virtual queue, according to various embodiments.

FIG. 9 is a screenshot 900 from an exemplary TDMA displaying status of a VQ, according to various embodiments. During operating hours, after login the driver is presented with the current status of the Wait List 910. The driver may also be provided, by the back-end system 630, with a status 920 of the queue location. A driver may select the "Request Entry" icon 930 on the interface 900 to make a reservation on the VQ. The back-end system 630 may be provided a location associated with the TDMA 605 corresponding to the driver requesting entry, whereby the corresponding TDMA 605 detects the location where the request for entry was made and the corresponding device location every 30 seconds subsequent to the initial detection.

Figure 10:
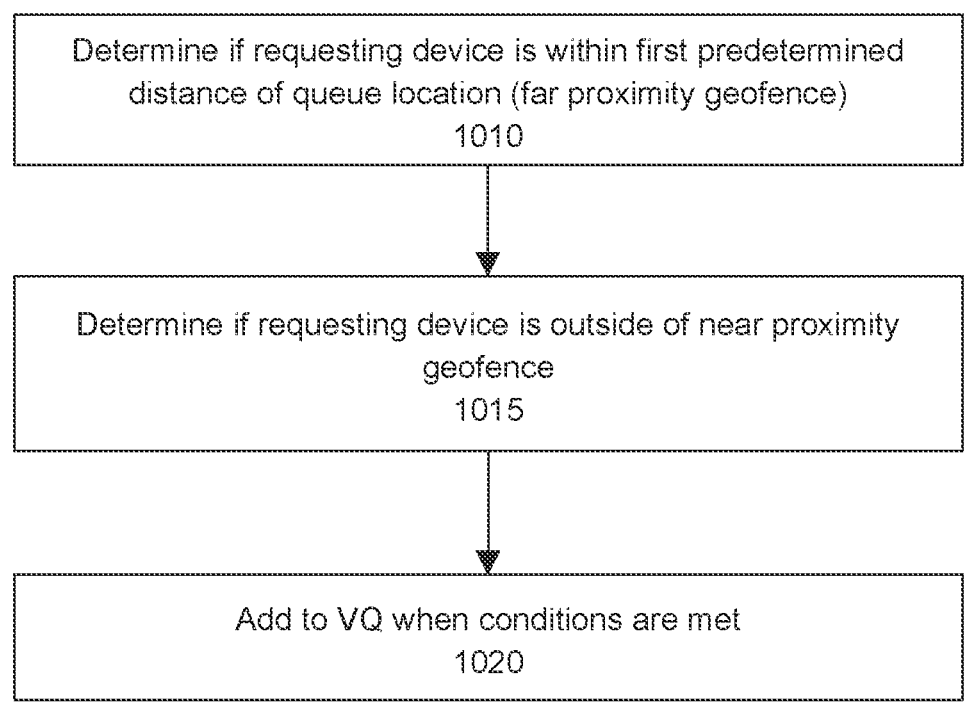
FIG. 10 shows a flow diagram of a method of confirming that a requesting device meets the requirements to join a virtual wait list, according to an embodiment.

Returning to method 700, in response to receiving the request to join the VQ, the back-end server may determine, using a geo-fencing feature, if the user computing device meets the requirements to join the VQ at step 715. These requirements may include, at a minimum, that the TDMA-hosting device associated with the request is within a first predetermined distance of a queue location, where the queue location is a destination of the requesting user vehicle (e.g., a holding lot). The area within a predetermined distance of the queue location may be referred to as a "geofenced area" herein, with the "geofence" referring to the perimeter of the area. FIG. 10 shows a flow diagram of a method 1000 of confirming that a requesting device meets the requirements to join a virtual wait list, according to an embodiment. Method 1000 may be performed by back-end system 630 in communication with TDMA 605 via TDM data interface 614.

Before explaining method 1000, a description of the various modules and components of back-end system 630 will be provided. The verification that the TDMA-hosting device associated with the request may be performed by the Messaging Services module 632 of back-end system 630. The Messaging Services module 632 may include an Authentication and Authorization component 820, which may compare the user credentials, username and password, from the TDMA and the VQM, and compares them against the stored credentials provided by the user. If they match, the system checks the user profile for authorization. If they do not match, the system denies access. For TDMA users, authorization may be granted if their user profile includes the proper medallion attributes to participate in the taxi operation at the designated facility. For VQM users, the user profile is accessed to grant the proper privileges based on the assigned role of the user. The VQM supports two roles, supervisor and dispatcher, discussed above.

The Queue Management component 822 is responsible for maintaining the state of the wait list or the VQ. The wait list opens at a designated time allowing reservations to be placed on the queue if geofence requirements are met. Prior to this time, taxi drivers cannot place any reservations on the queue. During operational hours, the queue can be placed in a state of "pause", where reservations can be placed but no one will be called in due to oversupply at the holding lot. Notifications are sent to all users logged into the TDMA indicating that no one will be called into the operational facility while the queue is in "pause" state. The queue can be "un-paused" by the VQM and normal operations ensue.

The queue can be placed in the state of "suspended" where all reservations are called in simultaneously due to under supply of taxis at the holding lot. Notifications are sent to all users logged into the TDMA indicating that reservations are not required to holding lot. When the queue is taken out of "suspend" state, normal operations ensue. At the end of the shift, the VQ is closed, and all reservations are discarded. The queue remains in this state until the next operational day.

The Reservation Management component 824 manages the lifecycle of reservations on the wait list including placing and removing reservations based on the events that have been triggered and received from the Supply Management component 829. The Monitoring Services component 825 monitors the operation of various entities of the system to achieve optimal taxi operations. The following are monitored in real-time:

The occupancy of the holding lot.
The number of reservations on the wait list.
The number of drivers in-transit to the facility.
The number of drivers who have confirmed their call-in.
The number of drivers who entered the garage.
The number of drivers who canceled a reservation.
The number of reservations which did not meet the SLAs.
The number of reservations which did not meet SLAs but were overridden and allowed entry into the garage.
Any of the above-listed metrics may be segmented by specific time-periods and aggregated to give daily totals.
Timers to enforce the Service Level Agreements for confirming the call and time for traveling to the holding lot.

The calculation of personalized wait-times for each driver on the wait list and how long they can expect to be on the wait list.

Driver position on the wait list.

Estimated wait time in the holding lot until dispatch to the curbside.

The Session Management component 826 manages a data structure called a user "session" associated with each user account that is logged into a mobile application associated with the queue management system. A session data structure may contain information about the user account that can be referenced by the system to enforce certain business rules. The information included within a session may include driver and vehicle identity, time of login, location of login, session expiration time and the state of the session. The session may be configured to expire at a predetermined time every day. A new session may be created on the next business day in response to when the user logs into the TDMA. The session may be referenced by other components in the system.

The Location Tracking component 828 may be used for determining the location of the user's device while performing taxi operations. The latitude and longitude coordinates of the user computing device may be compared against geofence boundaries to determine if the device is within a particular geofence, at a specific, relevant location, or if specific geospatial business rules are met. The device may be tracked when a user session is active. Geofencing tracking with respect to step 715 of method 700 may be performed by the Location Tracking component 828.

The Supply Management component 829 manages the number of taxis to call from the wait list to maintain adequate supply at the facility for current demand. The Supply Management component 829 uses the predicted demand from the Prediction Engine for the current time period and uses the current occupancy of the holding lot facility to establish the number of taxis to call in from the wait list. This algorithm is used to maintain a buffer of taxi supply at the facility to accommodate variances in demand. See FIG. 4.

The State Management component 830 is responsible for tracking the proper state of the various entities managed by the back-end system. The entities include the wait list, reservations, user trips tracked under the optional Short Trip program (described below), and sessions. By using the Notification module, the proper state is communicated to the TDMA and displayed in the user interface. For the VQM, the modules support the state transitions for reservations and the VQ.

Next, the Administrative Services module 636 may include a Configuration Management component 852 that allows for configuration of customized values for operational parameters of the system. The parameters may include:

The daily start and end times for the VQ or wait list.

The time period value for taxi demand prediction calculations by the Prediction Engine. The time period may be set using any suitable increments, including a desired number of minutes or seconds between updating the prediction.

The training frequency for the Prediction Engine. Typical setting is daily.

The forecast duration for the Prediction Engine. Typical setting is six hours.

The frequency for automated reservation call-ins by the Supply Manager. Typical setting is five minutes.

The registration and assignment of roles for staff who manage the operation.

The maximum capacity of the holding lot. This is a seasonally adjusted value based on the physical layout and segmentation of the facility.

Service Level Agreement durations for time to confirm a call and the time allotted to get to the physical holding lot. The former is set to 10 minutes. The latter is set to 40 minutes.

The Driver and Vehicle Registration Management component 854 may manage the registration of each taxi driver who is authorized by a permitting authority to provide taxi services at the operational facility. The driver's identity, license, proof of insurance, driving record status as recognized by the local department of motor vehicles and other meta data is recorded, updated, and retrieved by the Driver and Vehicle Registration Management component 854. This component 854 further manages the registration of each taxi vehicle that is authorized to operate at the operational facility. The vehicle's medallion number, the operating company of the vehicle, vehicle data (e.g., make, model, year), license plate and other attributes are recorded, updated, and retrieved by the Driver and Vehicle Registration Management component 854.

The Business Rules Engine component 856 may allow for the configuration and evaluation of business rules used to enforce operational permit compliance. Rules may be configured and evaluated with required input values. The rule's output value may be either true or false for a given set of one or more inputs. Integrated components may provide the required input values for a specific rule. The rule output may be used by integrated components to manage the next state of the relevant entity governed by the operating permit.

The Scheduler component 857 maintains the schedule for the operating hours of the system. The Scheduler component 857 may trigger an event to open the wait list. Relevant recipients of the event may perform their necessary functions to enforce the business rules of the operation. The Scheduler component 857 may also trigger an event to shut down the operation at the end of the business day. During the daily operating hours, the Scheduler component 857 may trigger periodic events to synchronize tasks such as performing demand prediction calculations, updating wait times, occupancy metrics, automated call-ins from the wait list, and notifications to the TDMA and the VQM.

Figure 23:
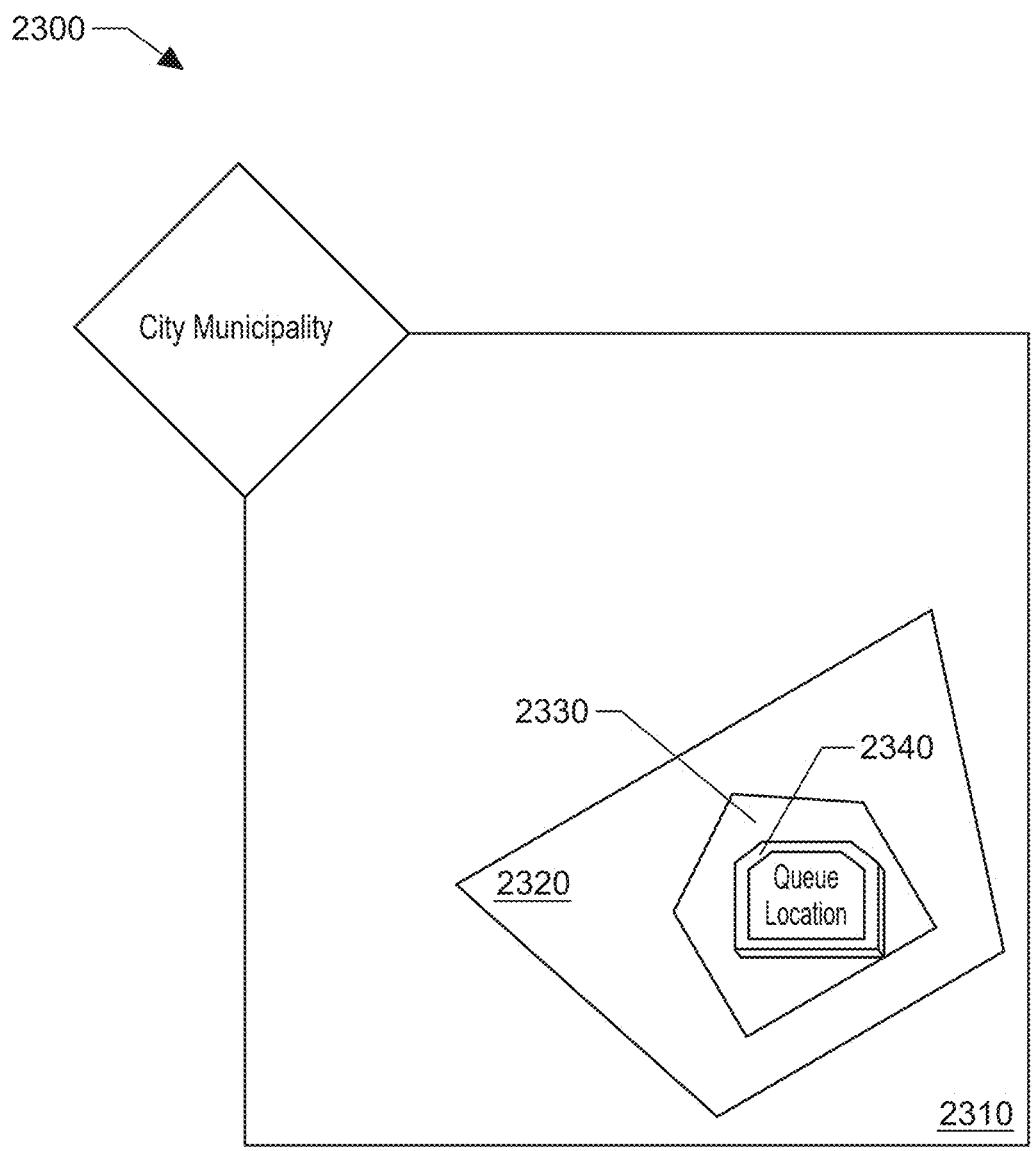
FIG. 23 shows a block diagram illustrating exemplary geofenced areas used by a virtual queue management system, according to an embodiment.

The Geofence Management component 858 registers and manages the geofences in the system that are required for operational permit compliance. The geofence locations may be shared with the TDMAs to determine the location of the device in relation to the applicable geofences. FIG. 23 shows a block diagram 2300 illustrating exemplary geofenced areas used by a virtual queue management system, according to an embodiment. The back-end server services 630 may use the defined geofences to enforce operational permit compliance. The following geofences are defined in the system:

A far proximity geofence 2310 that defines the boundary of the furthest area where a reservation can be made.

A near proximity geofence 2320 that defines the boundary of the closest area where a reservation can be made.

A third geofence 2330 that defines the boundary where a reservation is validated prior to entry of the physical holding lot.

A fourth geofence 2340 that defines the boundary of the physical holding lot(s).

The Activity Logging component 859 may be a utility that records all messages from all components of the back-end system 630, where the recordings may be used to perform audits and for debugging. Log analysis tools may be utilized to query and filter the messages for tracing operations during root cause analysis or debugging.

The Communication Services module 634 includes a Notification Management component, which may send messages from the back-end to the TDMA for the following:

- Messages in the user interface that inform the driver of changing values or states. This includes the driver's position on the wait list, their personalized wait time estimate until they are called, holding lot occupancy, and estimated wait time in the holding lot until dispatched.
- Messages that are not displayed to the user that change the state of certain entities within the mobile application, to synchronize with their parallel entity's state which is managed by the back-end services.
- Requests for confirmation of a call-in within the SLA time limit.
- Notifications that the VQ is paused or suspended.
- Notifications that the VQ is no longer paused and is in an active state, or is no longer suspended.

Finally, the Machine Learning Services module 638 may implement a neural network machine-learning model, also referred to as the prediction engine (PE) 882, that is trained using historical and real-time vehicle demand data. The PE 882 calculates the predicted number of taxis needed to meet demand, the estimated time that a driver can expect to be in the VQ, and the estimated wait time in the physical holding lot at the queue location. The features of the model may include data values for the following:

- Scheduled Flights
- Flights in Progress, On-time, Delayed, etc.
- Historical exit rates from the physical holding lot used as a proxy for taxi demand
- Holidays and special events
- Day of the week
- Time of Day
- Weather
- The number of passengers getting into each cab
- The number of vehicles returning from short trips entering the physical holding lot
- The number of vehicles with reservations that enter the physical holding lot
- The current occupancy of the holding lot The PE 882 may create a six-hour future forecast of taxi demand divided into 30-minute intervals. The forecast is an indexed array of demand predictions. The forecast is updated at a pre-defined time interval incorporating real-time data of current conditions. Using the forecast, the module creates estimated wait times for each taxi driver on the wait list based on their current position and the number of taxis ahead of them in the queue. This determines the index where the reservation position falls in the forecast. Adding up the reservations ahead of the reservation in the VQ from the beginning of the forecast to the index may yield the driver's estimated wait time.

TABLE 1

Demand Predictions by Time Period, Two Hour Example

| Index | 0 | 1 | 2 | 3 |
|---|---|---|---|---|
| Time Period | 12:01-12:30 | 12:31-1:00 | 13:01-13:30 | 13:31-14:00 |
| Demand Prediction | 7 | 10 | 11 | 6 |

A driver on the VQ in the 10$^{th}$ position can expect a wait time greater than 30 minutes but less than one hour since their position falls under index 1. The application would report an estimated wait time of one hour before the driver would be called in.

The Machine Learning Services module 638 may also include a Model Training component 884 that integrates with historical and real-time data sources to provide training data for the PE 882. Working with the Scheduler component 857 of Administrative Services module 636, the Model Training component 884 may commence processes to invoke the next training session. The training is performed daily after the operational day is complete. The Model Training component 884 provides the PE model 882 with real-time data from current operations to better predict and forecast taxi demand as the operational day progresses. As the PE 882 processes the real-time data, the internal weights in the neural network model are updated and new forecasts and predictions are calculated using these updated values.

Returning to FIG. 10, the determination of if the requesting computing device meets the requirements to join the VQ may begin by receiving a location of the user computing device together with the request to join the VQ. At step 1010, the back-end system 630 may confirm that the location of the user computing device with the queue location is within a far proximity geofence, the far proximity geofence being a first predetermined distance from the queue location. At step 1020, the backend system 630 may determine if the location of the requesting user computing device is outside of a near proximity geofence that is a second predetermined distance from the queue location, the near proximity geofence being a smaller area than the far proximity geofence, the second predetermined distance being less than the first predetermined distance. Confirmation that the requesting vehicle user meets the requirements to join the VQ may only be provided when the user computing device is also confirmed to be outside of the near proximity geofence and within the far proximity geofence. Finally, at step 1020, when both geofencing requirements are met and the TDMA device is within the far proximity geofence and outside of the near proximity geofence, then the reservation for the requesting TDMA may be generated and added to the VQ.

Returning to FIG. 7, in response to receiving confirmation that the requesting vehicle user is within the first predetermined distance, the server may automatically create a reservation message associated with the requesting vehicle user at step 720. The Reservation Management component 824 of the messaging services system 632 may add the reservation message to a data structure stored on the back-end server that includes a plurality of reservation messages, which may also be referred to as a wait list data structure at step 725. Also, in response to the creating the reservation message associated with the requesting vehicle user, the server may provide the requesting vehicle user with a notification, via the user application over the network connection, at step 730. The notification may include a position within a queue managed by the data structure and an estimated wait time that is generated using information stored within the data structure (e.g., how many other reservation messages are in the queue, and estimated times of arrival of vehicles associated with the other reservation messages ahead in the queue of the reservation message for the requesting user vehicle).

Figure 11:
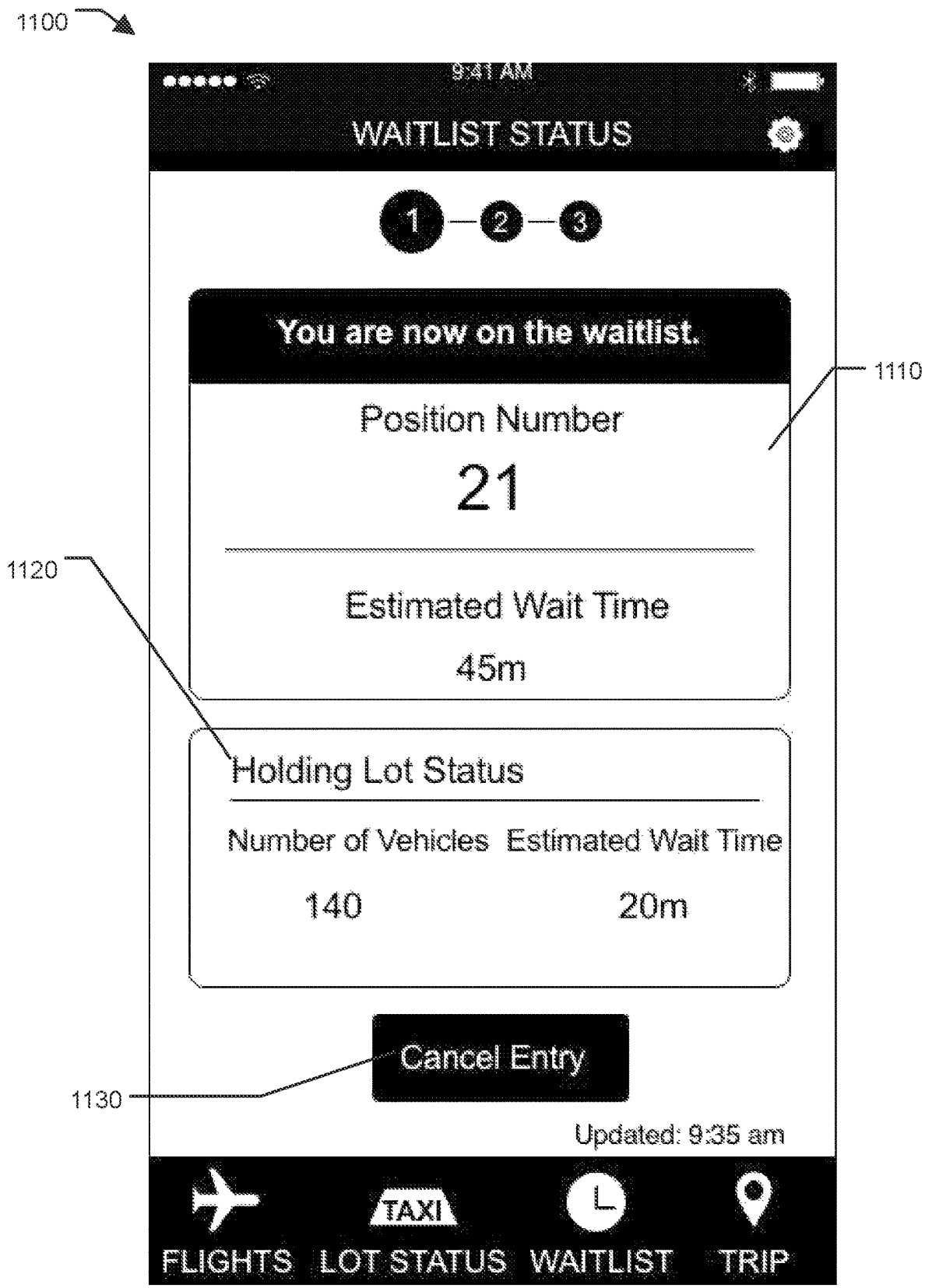
FIG. 11 is a screenshot from a mobile application displaying a notification that the virtual queue has been joined, according to an embodiment.

FIG. 11 is a screenshot 1100 of an interface from a mobile application displaying a notification that the VQ has been joined, according to various embodiments. The GUI 1100 displays the driver's position 1110 on the VQ and the estimated time they will remain on the list until being called. The GUI also displays the current holding lot occupancy 1120 and the average time that a driver will spend in the holding lot until being dispatched to the curbside. The user is provided an option to cancel the reservation by selecting icon "Cancel Request" 1130. The back-end system 630 provides the information in interface 1100, including using the prediction engine to calculate all estimated wait times, including the personalized queue wait time and holding lot wait time.

FIG. 8 also includes modules and components pertaining to the operation of the VQM. VQM Data Interfaces module 838 includes a set of REST APIs 832 which includes specific endpoints used by VQM 840. The Data Interfaces module 838 may also include an Encryption component 834. Encrypted communications are achieved by using the following protocols: Transport Layer Security (TLS) implemented on Secure Hyper Text Transfer Protocol (HTTPS). Using a TLS Certificate issued by a certificate authority, the server's identity can be verified, which verifies the communications are from the origin server and not from a "man in the middle" attack.

Also, VQM 840 provides a GUI for the dispatcher working at the holding lot facility to manage the wait list operation. The GUI provides the necessary user interface controls and data views for the dispatcher. Each of the following components except the network adaptor 876 use the GUI for user interaction.

The Capacity Management module 862 manages the following capacities:
1. Physical Holding Lot Capacity
2. Buffer size in the holding lot: The buffer size is a value that the system attempts to maintain, a supply buffer to accommodate variances in demand throughout the operational day.

The Communications component 864 is responsible for maintaining communications between the VQM and the back-end services. The Communications component 864 supports the following protocols: HTTPS over REST APIs, in-app messaging for iOS and Android operating systems. The Communications component 864 is dependent on the Network Adapter 876 for network transport. The Configuration Management component 866 manages parameters that can be adjusted to optimize operations. These parameters include the following:
1. Call Confirm SLA: Time for taxi driver to confirm after receiving a call to the holding lot
2. Garage Entry SLA: Drive time to enter the holding lot
3. Reason Codes for invalid Reservation Overrides
4. Roles and Permissions of VQM users
5. Operating Hours of the Wait List
6. Frequency of taxi demand predictions
7. Geofences
8. Geofence distance rules The Driver and Vehicle Registration Management component 868 manages the registration of drivers and vehicles in the system. A driver who applies and is approved for a permit to operate at the operational facility is registered in the system. The fleet of vehicles registered in the system can belong to a taxi company with a specific color scheme or an individual owner. Each vehicle must be assigned a unique medallion number. A vehicle can be operated by one or more authorized taxi drivers if the vehicle belongs to a taxi company fleet.

The Reservation Management component 869 manages the states of a reservation where an override is granted or denied during the verification process. The dispatcher in the holding lot can change the state of the reservation to accommodate exceptions that may cause the driver to miss their SLA. At the discretion of the dispatcher, an override with a reason code can be issued to grant entry for the driver and vehicle. The reservation state would be changed from invalid to valid. The lifecycle of the reservation can be viewed to trace the history for exception handling processes.

The Supply Management component 872 manages the number of drivers to call in based on four modes of operation:
1. The first mode is a manual call where the dispatcher determines the number of taxi drivers to call in for a given time period.
2. The second mode is an automated call where the PE's demand prediction and forecast determines the number of drivers to call in for a given time period. This mode can utilize the buffer configured in the Capacity Management module 862 to supplement the prediction values.
3. The third mode is an automated call of the number of taxis called in for a given time period comprised of the difference between the number called in the previous time period and the number of drivers who actually arrived at the holding lot.
4. The fourth mode includes automated rule-based behaviors responsive to when a driver cancels or misses the call-in SLA. First, when a driver is called and cancels the request, the next available driver on the waitlist may be called in automatically. Second, when a driver is called but misses the call in SLA, the next available driver on the waitlist may be called automatically. Third, when the driver confirms the call-in and then cancels the request, the next available driver on the waitlist may be called automatically.

The Monitoring component 874 manages the collection and display of various statistics that help the dispatcher gain situational awareness of the operation. The statistics can be used to moderate the supply of taxis given current demand conditions. Finally, the network adaptor 876 of the mobile computing device for cellular and wi-fi protocols is used by the VQM Mobile Application 840 to communicate with the back end system. The network transport layer provided by the Network Adapter 876 enables the VQM Mobile Application 840 to send and receive data via REST APIs and to receive in-app messages from the back end.

Figure 12A:
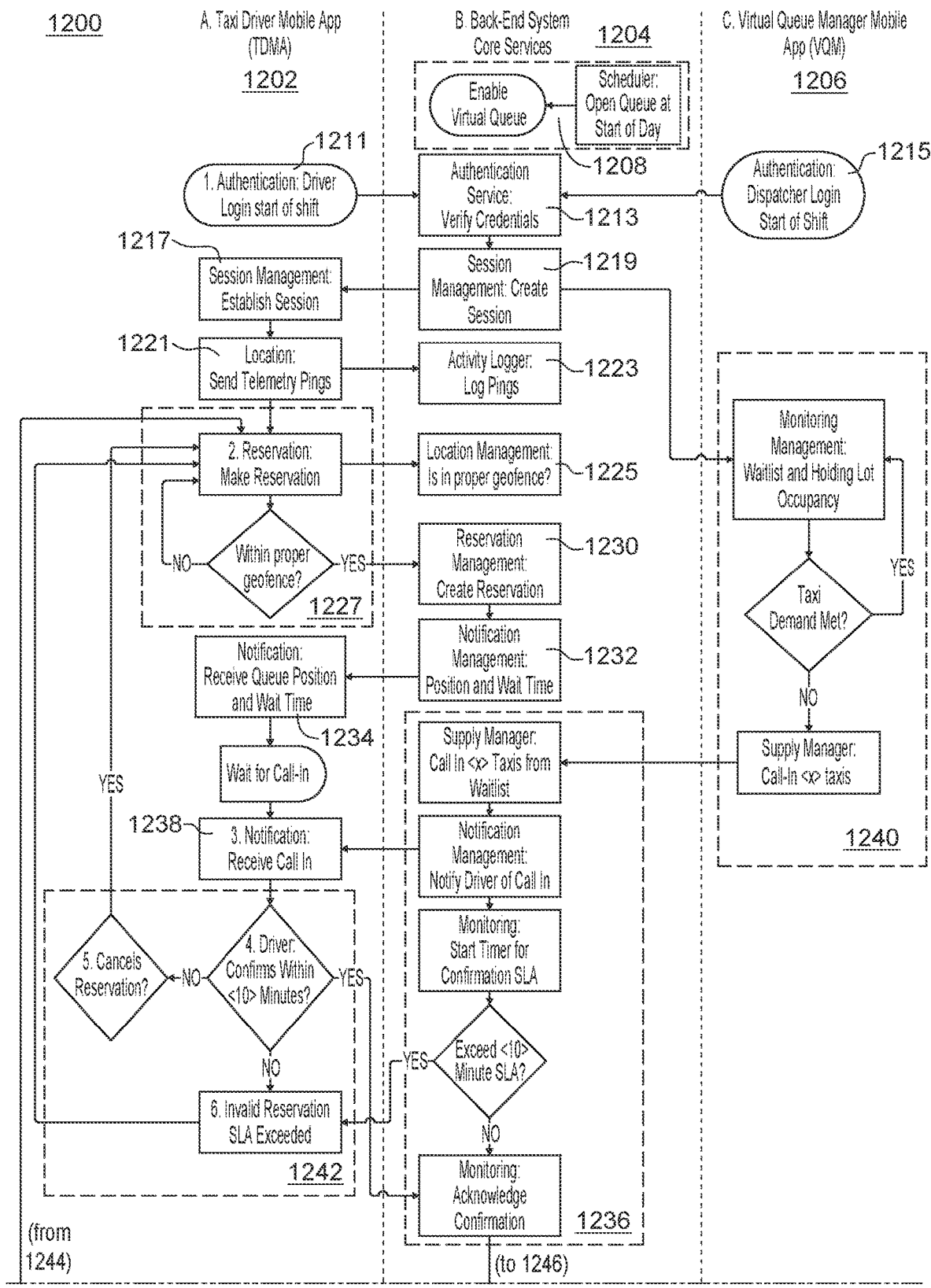
FIGS. 12A-B show a flow diagram displaying an event sequence for interactions between a mobile application on a requesting device, a mobile application to administer a virtual queue, and back-end services, according to an embodiment.
Figure 12B:
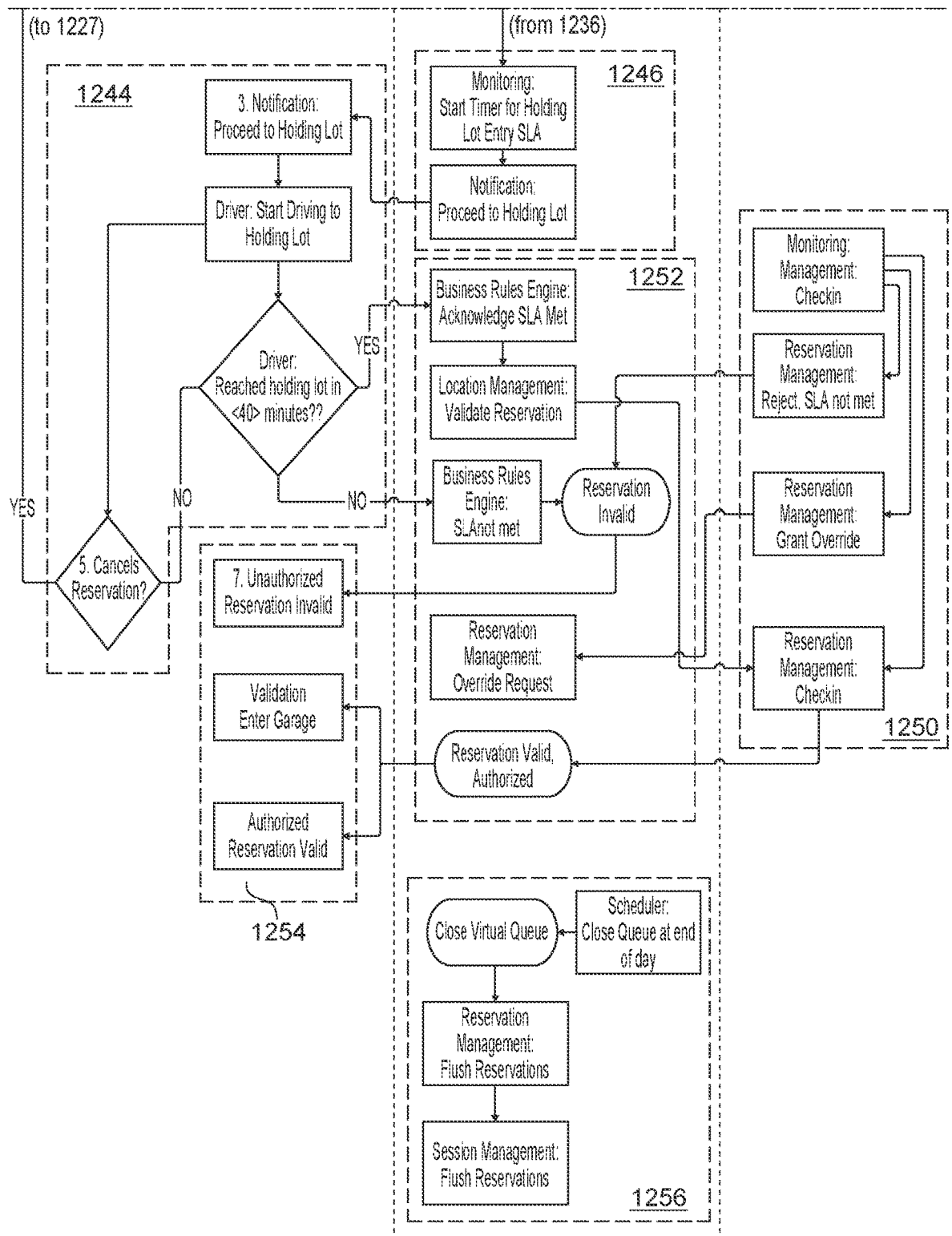

FIGS. 12A-B show a flow diagram displaying an event sequence 1200 for a VQM Mobile Application 1202 on a requesting device (i.e. the TDMA) to interact with a VQ using back-end services 1204, according to an embodiment. Event sequence 1200 summarizes and provides further detail regarding the steps described above, in addition to other steps performed by the TDMA 1202, the back-end system 1204, and the VQM 1206. Individual blocks in event sequence 1200 may refer to corresponding modules and components in detailed system diagram 800 shown in FIG. 8. For example, step 1213 indicates that it is performed by an "authentication" component of the backend systems 1204 (e.g., Authentication component 820 of backend systems 630 of FIG. 8).

After a queue is opened at block 1208, at step 1211 a driver may log in to the TDMA 1202 using their credentials, which may be validated by the authentication component of the back-end system 1204 as described in step 1213. If authentication fails, the driver is not granted access to the TDMA 1202 and the user interface displays the login screen with an error message. In parallel, a dispatcher may log in to the VQM 1206 at step 1215. A session may be established by the TDMA at step 1217 and the back-end server at step 1219. The location of the TDMA may be established at step 1221 and logged by the back-end server at step 1223. Block 1227 may include the steps of generating a request to join the queue, described above. Generating the request may include the TDMA 1202 comparing the location of the vehicle associated with the TDMA 1202 with the geofences. The TDMA 1202 may store local copies of the geofence locations within its application memory space to perform location detection. This may be advantageous because the geofence calculation is expensive to perform, and doing so on the back-end server may cause scaling and performance issues. By doing the calculation on the client side, the computational load may be efficiently distributed across individual clients. Even if the TDMA 1202 is outside of the proper geofence, the request may still be generated and transmitted to the back-end server, to synchronize state between the TDMA and the back-end. Since the back-end records all messages and events between the TDMA and back-end, this serves as historical evidentiary data for auditing purposes and compliance enforcement of the permit's business rules.

At block 1225 the back-end system 1204 may verify that the requirements to join the queue are met by the TDMA 1202, and the reservation message may be created and added to the VQ at block 1230. The notification is generated and sent to the TDMA 1202 at block 1232 in response to the determination that the queue requirements have been met. After receiving the notification at block 1234, the TDMA waits until a call-in notification is received requesting that the user report to the queue location at step 1238. The call-in notification is transmitted by the back-end system 1204 based on the determinations made in block 1236. When a call-in request from the VQM 1206 via block 1240 is received by the back-end system 1204, notifications are transmitted to the first x number of reservations on the VQ, where x is a predetermined number, produced by a human dispatcher or by the PE, received in the call-in request. The monitoring component starts a timer after sending the call-in notifications, where users responding to the call-in notifications must meet an SLA-required time period for the method to proceed.

The driver's response to the call-in is received by the TDMA 1202 as part of decision block 1242, which also allows the driver to decline the reservation if desired. Blocks 1236 and 1246 also describe the validation process at the queue location, where the back-end system 1204 may invalidate the reservation if the SLA time limit is exceeded for responding to the call-in. If the SLA time limit is satisfied, then the TDMA proceeds to block 1244, where a notification is provided to proceed to the queue location. The TDMA then monitors if the vehicle is able to reach the queue location in time for a second SLA requirement. A validation by the dispatcher may occur at the VQM 1206 in block 1250. Assuming the second SLA requirement is met, the vehicle associated with the TDMA is authorized to enter the lot in block 1252, and entry occurs by the TDMA at block 1254. At the end of a day, the steps in block 1256 may be executed, where the Scheduler module requests that the VQ be closed, the Reservation Management module flushes any remaining reservations on the VQ, and the Session Management module flushes any active sessions remaining.

Figure 13:
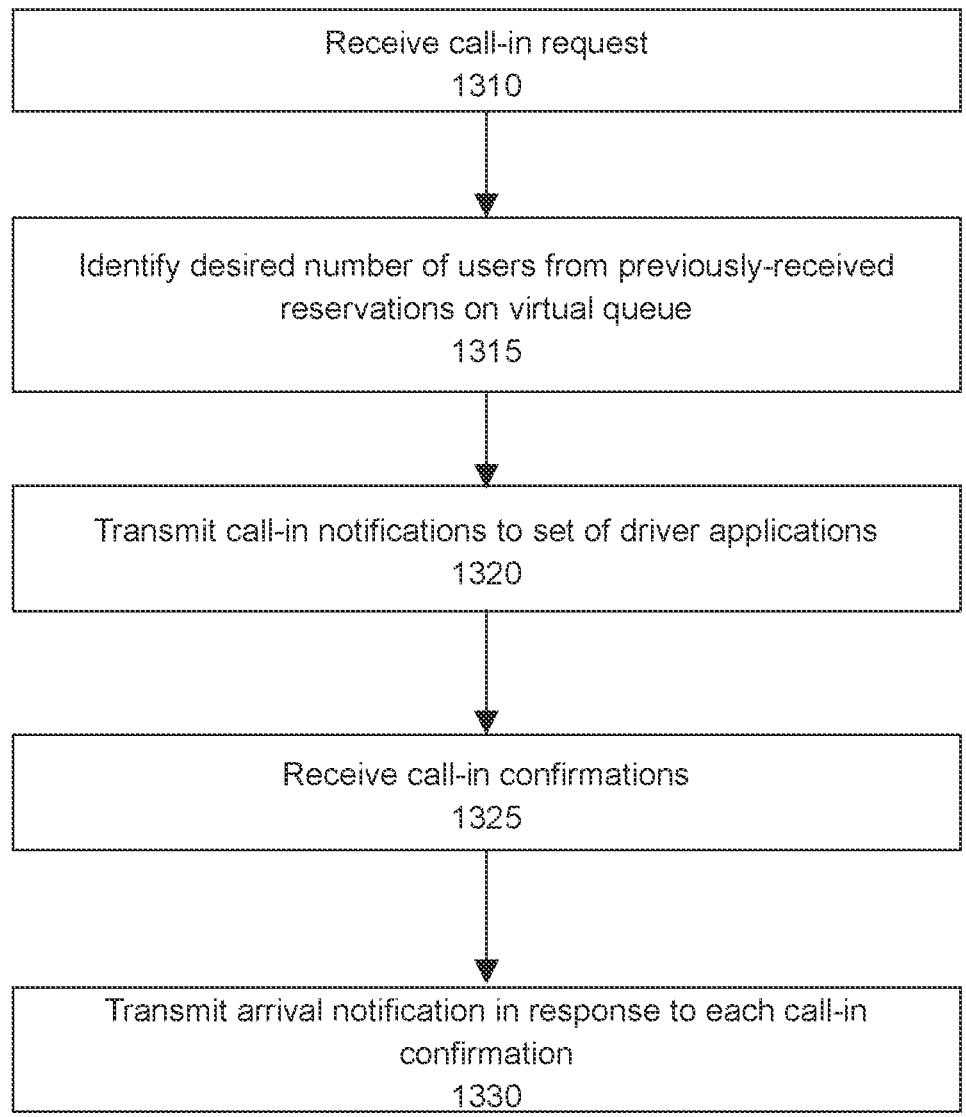
FIG. 13 shows a flow diagram of a method of location-based virtual queuing of vehicles, according to an embodiment.

FIG. 13 shows a flow diagram of a method 1300 of location-based virtual queuing of vehicles, according to an embodiment. Method 1300 may be a more detailed diagram explaining blocks 1240 and 1236 of flow 1200. At step 1310, a call-in request may be received that includes a desired number of vehicles. The request may be received by a back-end system from a queue manager application via a network connection, as is shown in flow 1200. In response to receiving the call-in request, a plurality of vehicle users may be identified from a data structure that includes a VQ of previously-received reservations at step 1315. The previously-received reservations, as described above, may be associated with driver applications having been determined to be within a first predetermined distance of a queue location via a geo-fencing feature, the determination having been made prior to adding the previously-received reservations to the VQ. Also in response to receiving the vehicle request, a call-in notification may be transmitted to a set of driver applications via the network connection at step 1320. Each driver application may be associated with a reservation within the data structure, and the set may include the desired number of driver applications, to meet the demand for vehicles at the queue location.

Call-in confirmations may subsequently be received over the network connection from the set of driver applications at step 1325. In response to receiving each call-in confirmation, an arrival notification may be transmitted to the transmitting driver application at step 1330. The arrival notifications may each include a time that the transmitting driver application is expected to reach a third geofenced area associated with the queue location. The third geofenced area may correspond to a pre-validation zone that encompasses the queue location itself and a small, predetermined distance surrounding the queue location. The third geofenced area allows to the system to pre-validate the driver's reservation before they enter the physical holding lot. This allows the TDMA device to transmit telemetry and data prior to avoid any interference from concrete structures that could impede GPS and cellular connectivity. The fourth geofence is the geofence of the queue location itself, which may be a holding lot for vehicles in some embodiments. Device presence of the device running the TDMA within the fourth geofence may confirm that the vehicle has entered the queue location itself.

In some embodiments, an arrival notification may be received from one of the set of driver applications. The reservation may be invalidated when the arrival notification is not received before the time that the transmitting driver application is expected to reach the third geofenced area. The invalidating of the reservation may include transmitting a denial notification to the queue manager application that includes a SLA denial message. The SLA requirements may include predetermined time requirements for a user to respond to a notification received from the back-end system 1204 by the TDMA. For example, after receiving a call-in notification and confirming intent to proceed, a user may have 40 minutes to arrive at the third geofenced area for pre-validation. Another example SLA requirement may be that the user may have 10 minutes to respond to a call-in notification. The SLA requirements are predetermined by users of the queue manager application, and may be adjusted to any desired time interval. Reservations may also be invalidated when an invalidation notification is received from the back-end system that one of the set of driver applications has reached the third geofenced area after the time that the transmitting driver application is expected to reach a third geofenced area. In response to receiving the invalidation notification, the back-end system may modify the reservation message to reflect invalidation of the reservation.

On the other hand, a check-in request may be transmitted to the queue manager application via the network connection when the arrival notification is received before the time that the transmitting driver application is expected to reach the third geofenced area. To complete the check-in, an authorization may be received by the queue manager application via the network connection. The authorization may include an indication that the one of the set of driver applications is authorized to enter the queue location. This authorization may be transmitted to the one of the set of driver applications via the network connection to inform the user that they can enter the queue location as an authorized vehicle.

Figure 14:
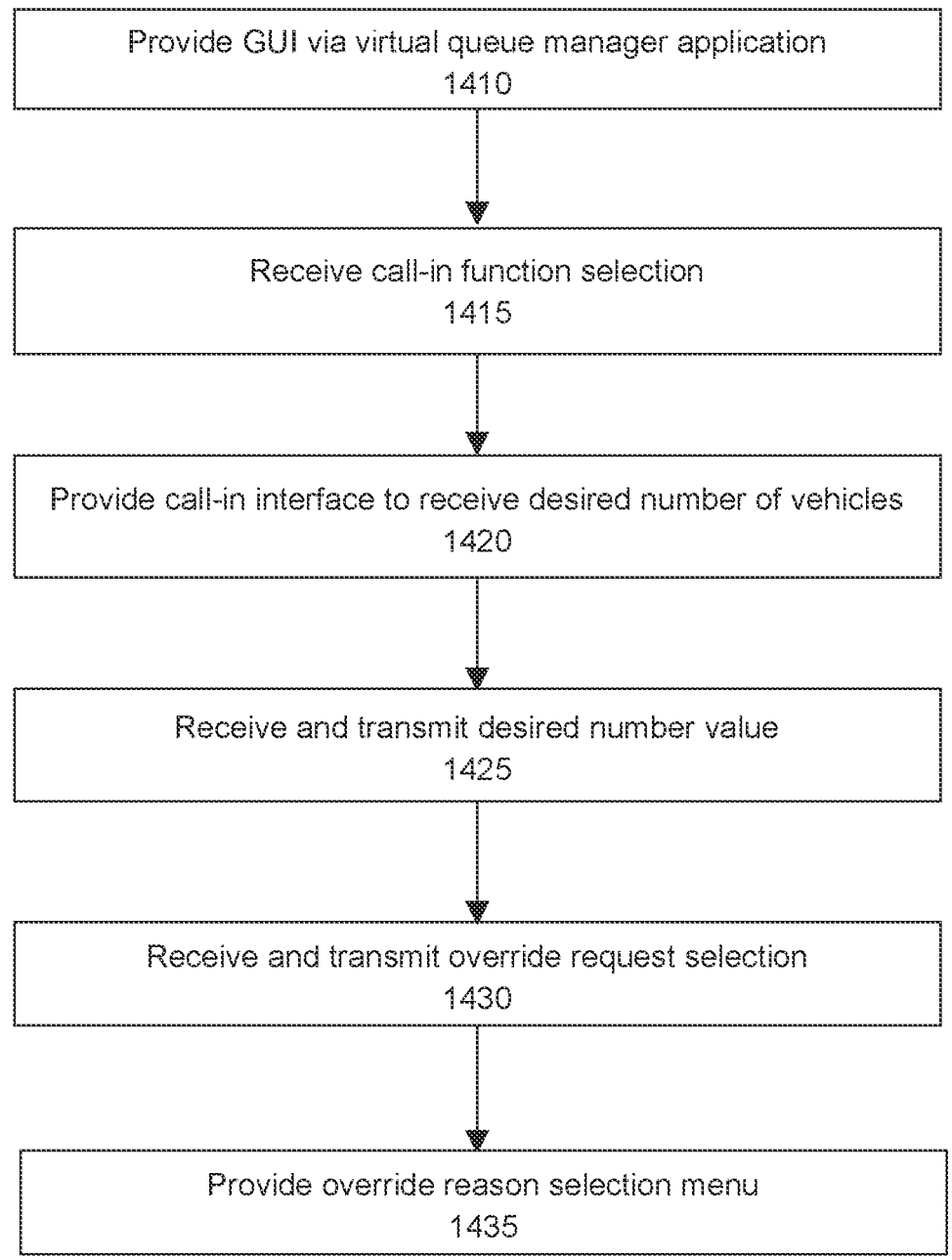
FIG. 14 shows flow diagram of a method of managing location-based virtual queuing of vehicles on a user interface, according to an embodiment.
Figure 16:
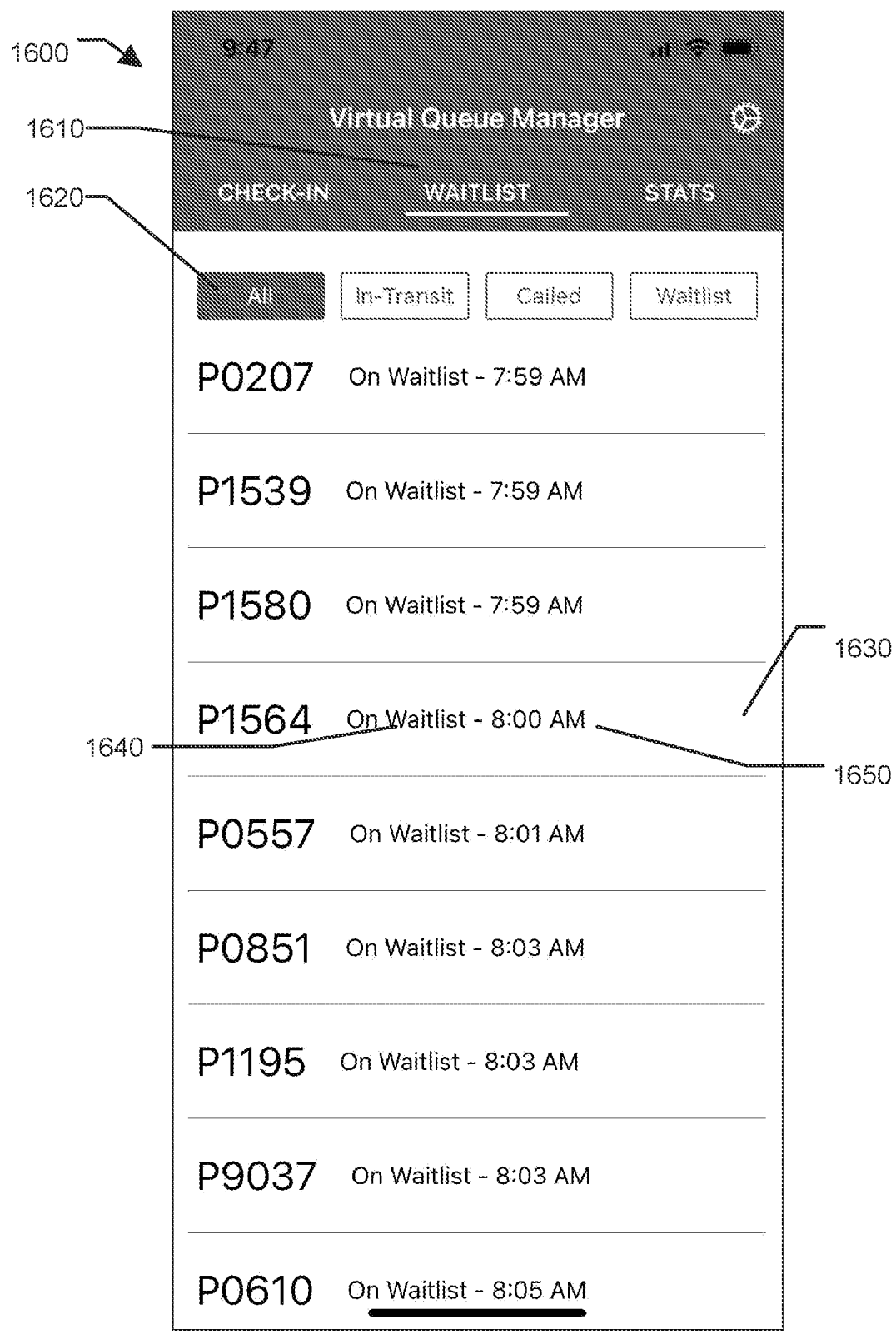
FIG. 16 is a screenshot from a mobile application displaying a virtual queue of reservations for a queue location, according to various embodiments.

FIG. 14 shows flow diagram of a method 1400 of managing location-based virtual queuing of vehicles on a user interface, according to an embodiment. Method 1400 may be a more detailed diagram detailing how the interface of the VQM 1206 is used to manage flow 1200. At step 1410, the computing device running the VQM may provide a GUI via the VQM running on a user computing device. FIG. 16 is a screenshot 1600 from a mobile application displaying a VQ of reservations for a queue location, according to various embodiments. As seen in screenshot 1600, the GUI may include a list of selectable reservations on a VQ, such as reservation 1630. As discussed above, the selectable reservations may be associated with driver applications having been determined to be within a first predetermined distance of a queue location via a geo-fencing feature, the determination having been made prior to adding the previously-received reservations to the VQ.

Figure 17:
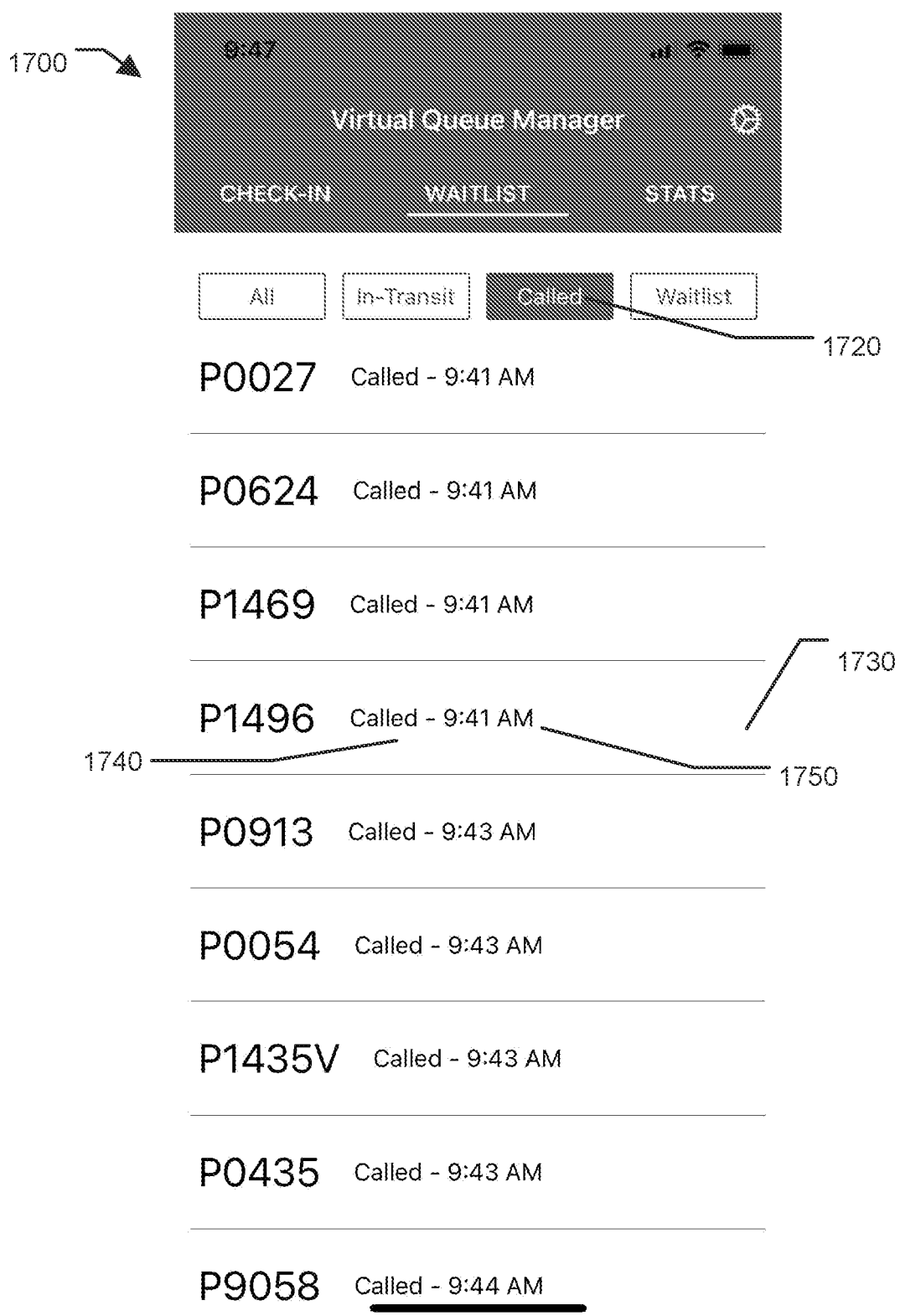
FIG. 17 is a screenshot from a mobile application displaying a filtered virtual queue of reservations for a queue location, according to various embodiments.

As shown in screenshot 1600, each reservation may be associated with a driver application running on a user computing device, as indicated by the medallion number in the left column of interface 1600. Each reservation 1630 may also include a status indicator 1640, and a time 1650 associated with entry to the VQ. The status indicator, in the exemplary embodiment shown, for each selectable reservation may be one of a waitlist status, an in-transit status, a called status, or a short-trip status. Also as shown in screenshot 1600, the reservations may be filtered based on the status indicators in some embodiments. FIG. 17 is a screenshot 1700 from a mobile application displaying a filtered VQ of reservations for a queue location, according to various embodiments. As shown in screenshots 1700, a user has selected the "Called" status filter 1720, and in response, the GUI 1700 includes only reservations having the called status indicator. As in GUI 1600, each reservation 1730 shown includes its corresponding status indicator 1740 and the time associated with the reservation 1730 entering the VQ.

Figure 15A:
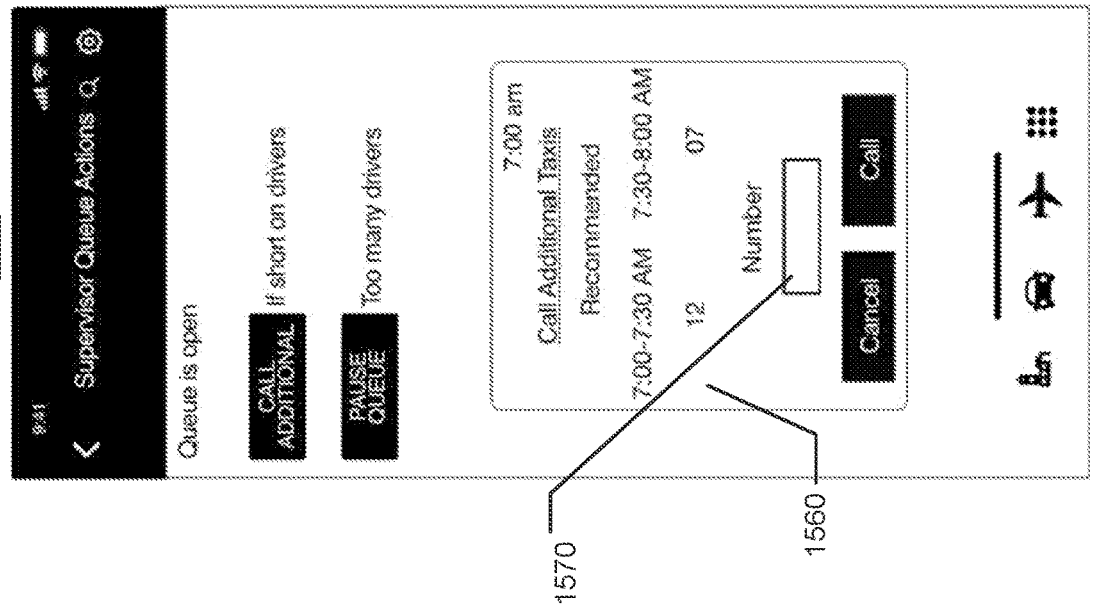
FIGS. 15A-B are screenshots from a mobile application displaying a process for generating a call-in notification, according to various embodiments.
Figure 15B:
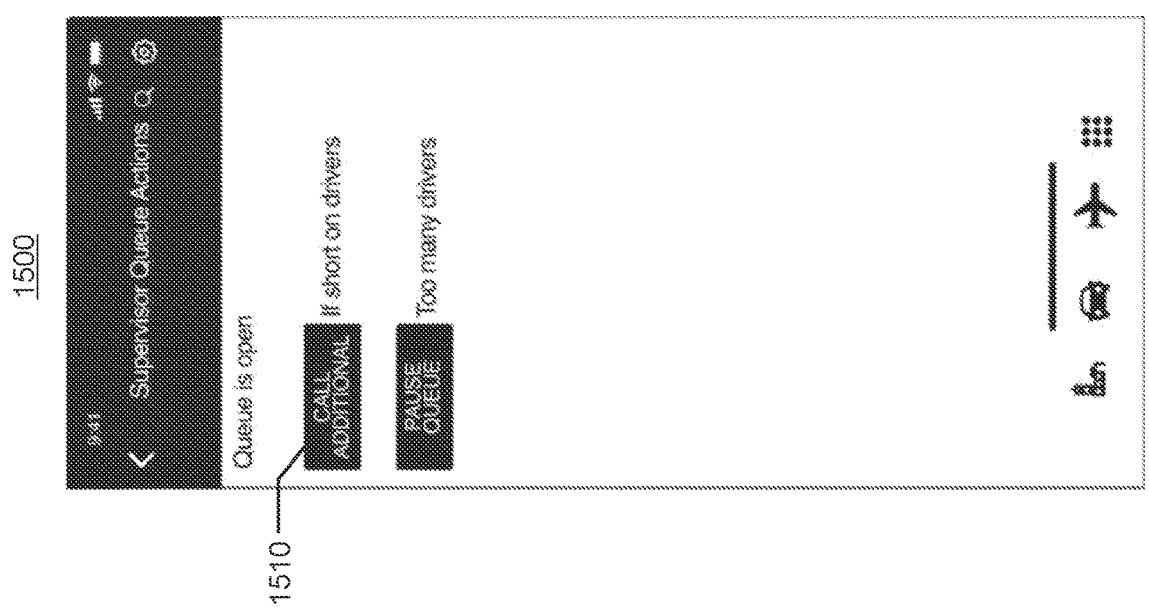

Returning to method 1400, at step 1415 a call-in function selection may be received on the GUI. FIGS. 15A-B are screenshots from a mobile application displaying a process for generating a call-in notification, according to various embodiments. Screenshot 1500 displays a GUI having a selectable call-in function 1510 displayed. In response to receiving a selection of the call-in function 1510, call-in interface 1560 may be displayed, as shown on GUI 1550. The call-in interface, as shown in step 1420 of method 1400, may include a number prompt 1570 capable of receiving a number value associated with a desired number of vehicles associated with the VQ. In some embodiments, the call-in interface 1560 may further include a recommended number of vehicles from the VQ based on a time associated with the selection of the call-in function, as is shown in GUI 1550. The recommended number of vehicles may be received from the back-end system via the network connection, and may be generated using mathematical modeling of vehicle demand at the queue location, as described above as being performed by the prediction engine component of the back-end system.

At step 1425, a desired vehicle value may be received via the call-in interface 1560. The receiving the desired vehicle value may cause the desired vehicle value to be transmitted to a back-end system. The back-end system, as shown in flow 1200 and as discussed above, may transmit call-in notifications to driver applications on the VQ associated with selectable reservations to trigger the call-in process.

Figure 18:
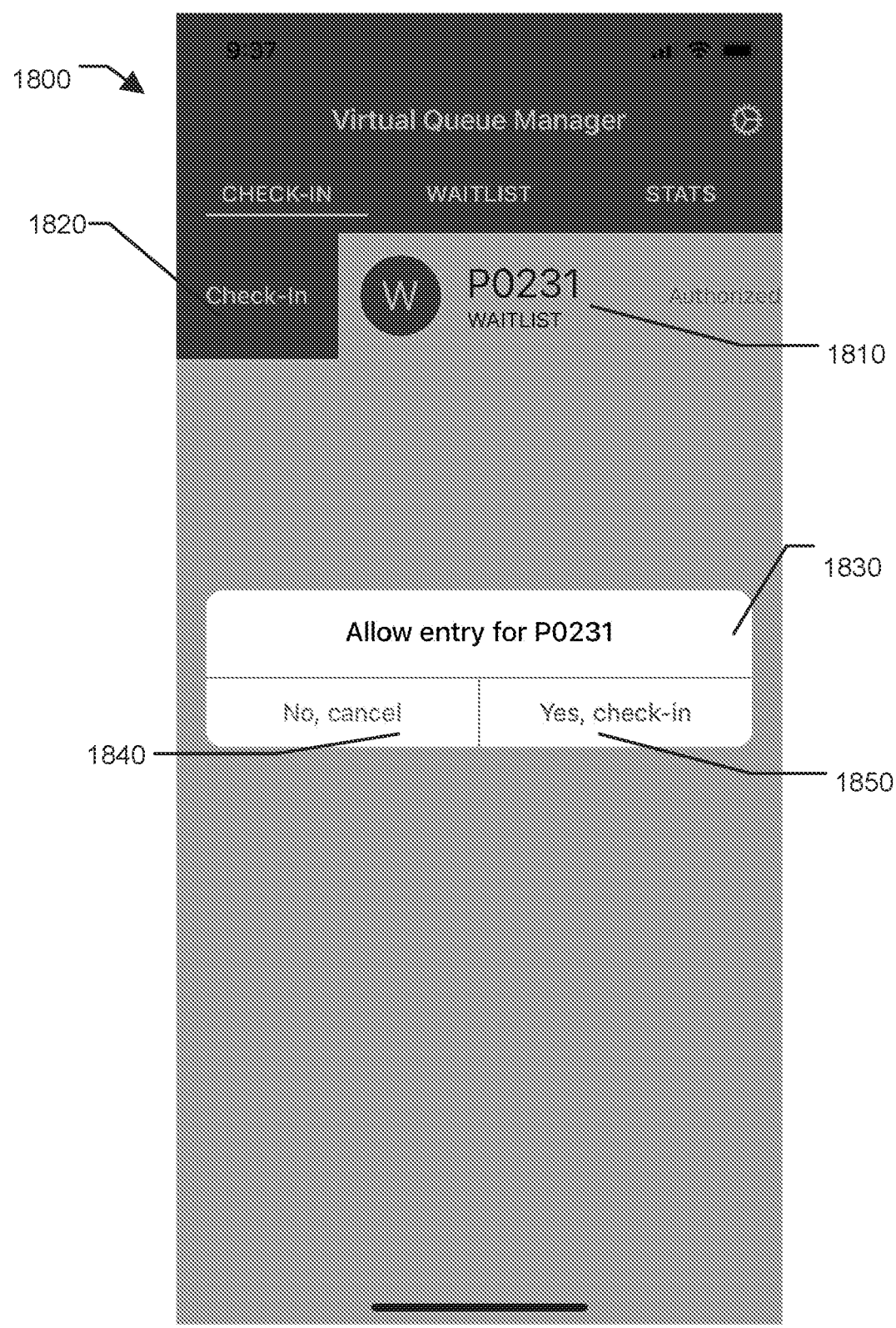
FIG. 18 is a screenshot from a mobile application displaying a check-in interface, according to various embodiments.

After one of the users associated with a selectable reservation has responded to the call-in, and arrived at the queue location, check-in may occur using the VQM. FIG. 18 is a screenshot 1800 from a mobile application displaying a check-in interface, according to various embodiments. A selection of one of the selectable reservations 1810 via the GUI 1800 may cause a check-in icon 1820 associated with the one of the selectable reservations to be displayed in response to the selection of the one of the selectable reservations. A check-in input associated with the check-in icon 1820 may be received via the GUI 1800, and a check-in message may be transmitted to the back-end system in response to receiving the check-in input. Also, check-in interface 1830 may be displayed in response to the selection of check-in icon 1820, giving a user the option to provide the check-in input 1850, or cancel the check-in by selecting cancellation option 1840.

Figures 19A, 19B:
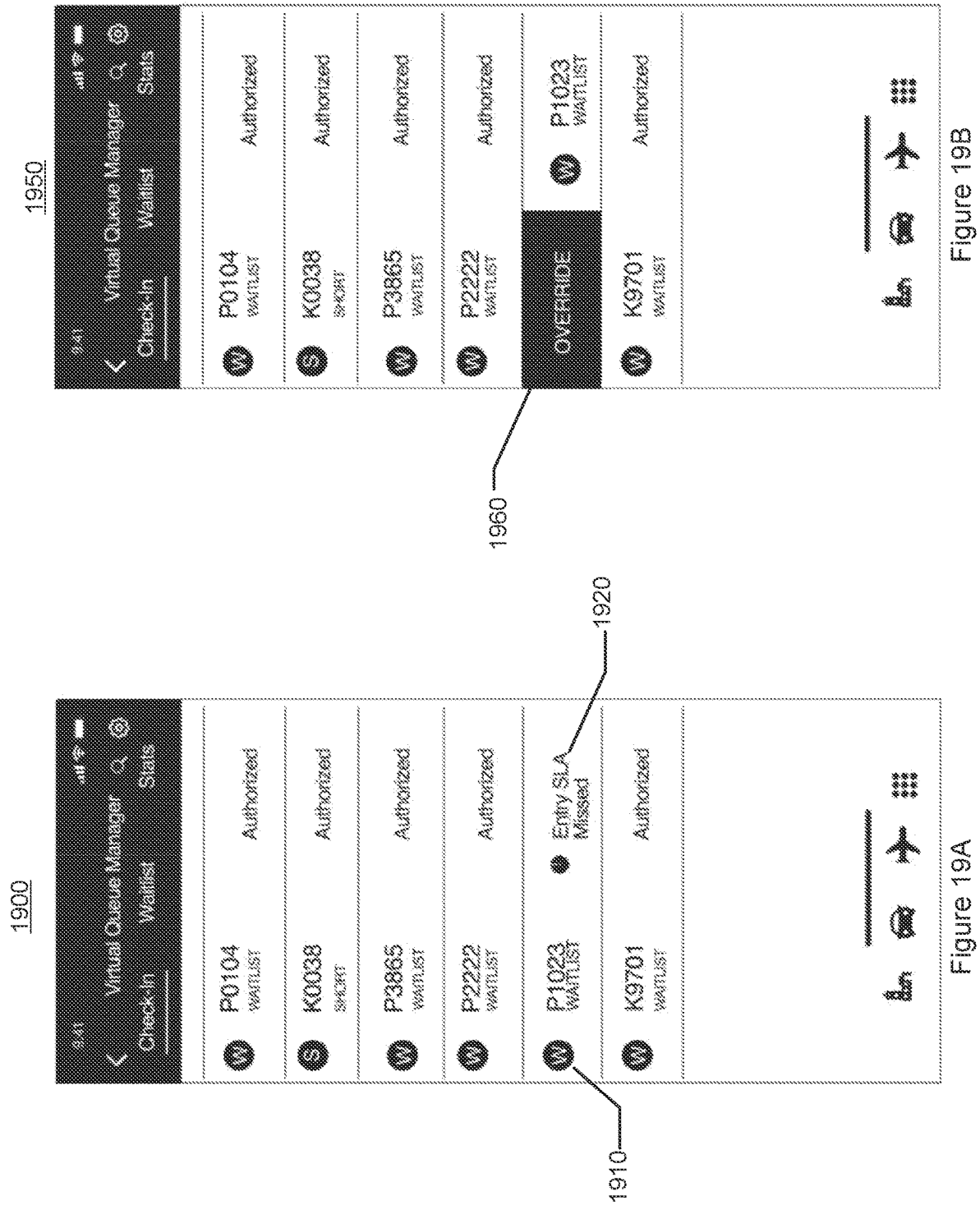
FIGS. 19A-B are screenshots from a mobile application displaying how an override of an invalidated reservation may be performed, according to various embodiments.

In addition to the foregoing, a user may override invalid reservations using the queue manager application at step 1430 of method 1400. FIGS. 19A-B are screenshots from a mobile application displaying how an override of an invalidated reservation may be performed, according to various embodiments. As shown in GUI 1900, one of the selectable reservations 1910 may include an invalidated status indicator 1920. In response to selecting reservation 1910, a selectable option 1960 to override the invalidated status indicator for a vehicle associated with the one of the selectable reservations may be provided, as shown in interface 1960. In response to receiving a selection of the option to override, a message may be caused to be transmitted to the back-end system indicating that the vehicle associated with the one of the selectable reservations is allowed entry at the queue location.

Further in response to receiving the selection of the option to override, a list of selectable reasons to allow entry may be displayed on the GUI at step 1435. FIGS. 20A-B are screenshots from a mobile application displaying an interface for allowing an override of an invalidated reservation, according to various embodiments. GUI 2000 illustrates an override interface 2010, which may provide options to override the invalidated status 2040 and to cancel the invalidation 2030 as shown. The override interface 2010 also includes reason menu 2020. When selected, the reason menu 2020 may display a plurality of reasons 2060 for the override, as shown in GUI 2050. Selection of any one of the selectable reasons may cause a message to be transmitted to the back-end system indicating that the vehicle associated with the one of the selectable reservations was allowed entry to the queue location for the selected one of the selectable reasons.

The VQM may provide relevant statistics of the operations for the dispatcher to determine how many drivers to call-in for the current time. FIGS. 21A-B are screenshots from a mobile application displaying various metrics generated by a back-end system for display, according to various embodiments. As shown in GUI 2100, at least one tracked metric may be requested from the back-end system in response to receiving a stats icon 2110 selection on the GUI. The at least one tracked metric may then be displayed, and three metrics 2120, 2130 and 2140 are shown in GUI 2100. The screen may be updated frequently to display recent data. The metrics displayed in the exemplary embodiment include a VQ status 2120, a queue location status 2130, and a dispatch rate metric 2140, though other metrics may be displayed in other embodiments (e.g., daily taxi demand, contrasting the number of taxis at the holding lot over a period of time). The dispatch rate metric 2140 may include selectable option 2145 to display more granular data. When selected, GUI 2150 may be displayed, providing detailed statistics 2160 on the number of taxis leaving the VQ, which may assist a user to determine how many drivers to expect at the holding lot.

Figure 22:
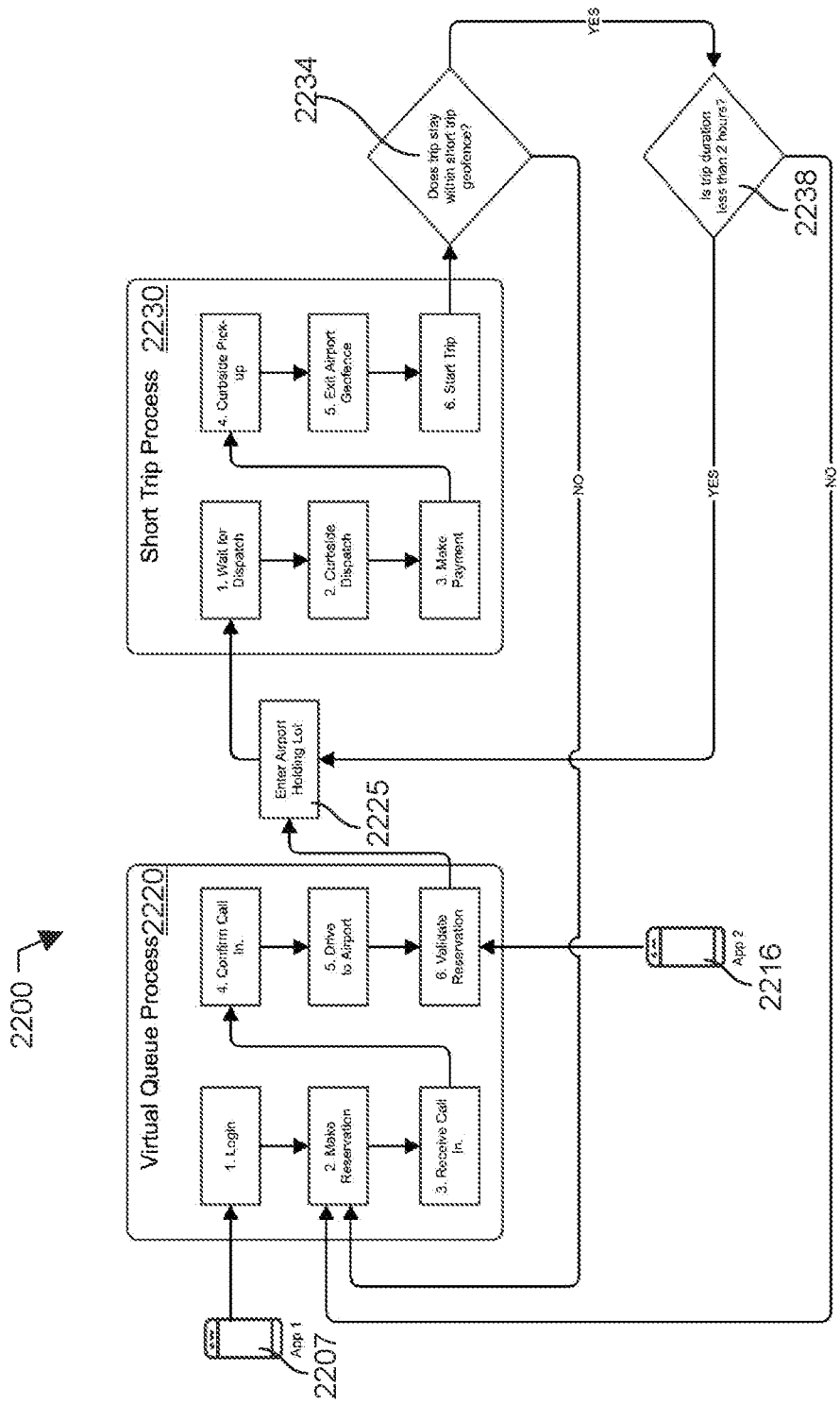
FIG. 22 shows a block diagram of an exemplary system for virtual queue management interacting with a location-based short trip tracker system, according to an embodiment.

The VQ system may be configured to work with other queue location management systems. FIG. 22 shows a block diagram of an exemplary system 2200 for VQ management interacting with a location-based short trip tracker system, according to an embodiment. The Taxi Short Trip Program (TSTP) grants front of the queue privileges for returning taxis in the taxi holding lot for trips from the airport that remain within a designated geofence and return within a designated time period. This trip is called a "short" trip. A trip that exceeds the geofence or time period requires the vehicle to join the VQ by making a valid reservation. The taxi trip starts when the vehicle exits the airport campus at designated locations.

The TDMA 2207 interacts with the back-end system as described above using the VQ process 2220, which is validated by VQM application 2216. A taxi trip that qualifies as a "short" trip after the steps 2230 are performed, a determination 2234 is made by the back-end system if the vehicle associated with the TDMA 2207 is within the short-trip geofence the entirety of a trip period. If so, and the trip is less than two hours per determination 2238, the vehicle associated with TDMA 2207 is allowed entry into the holding lot without a reservation to the VQ at step 2225. For drivers who are on "long" trips, they must follow the VQ process and make a reservation on the VQ to enter the holding lot when called.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for location-based queuing of vehicles, the method comprising:
   receiving, by a server over a network connection, a request to join a virtual queue that includes a plurality of user accounts, the request being associated with a requesting user associated with a vehicle, and being received from a user application operating on a user computing device;
   determining, by the server in response to receiving the request to join the virtual queue, by the server via a geo-fencing feature, if the user computing device is within a first predetermined distance of a queue location, the queue location being a destination of the requesting user vehicle, the determining further comprising:
   receiving a location of the user computing device together with the request to join the virtual queue;
   confirming the location of the user computing device is within a far proximity geofence, the far proximity geofence covering an area that includes the first predetermined distance from the queue location; and
   confirming that the location of the user computing device is outside of a near proximity geofence that covers an area that includes a second predetermined distance from the queue location, the near proximity being a smaller area than the far proximity geofence, the second predetermined distance being less than the first predetermined distance, the confirmation that the requesting vehicle user is within the first predetermined distance only being provided when the user computing device is also confirmed to be outside of the near proximity geofence and within the far proximity geofence;
   automatically creating, by the server in response to receiving confirmation that the requesting vehicle user is within the first predetermined distance, a reservation message associated with the requesting vehicle user;
   adding, by the server, the reservation message to a data structure stored on the server comprising a plurality of reservation messages; and
   in response to the creating the reservation message associated with the requesting vehicle user, providing the requesting vehicle user with a notification, by the server via the user application over the network connection, of a position within a queue managed by the data structure, the notification further comprising an estimated wait time generated using information stored within the data structure.

2. The method of claim 1 further comprising automatically providing a call-in notification to the user application over the network connection based upon a triggering event taking place after the providing the requesting vehicle user with the notification of the position within the queue, the call-in notification comprising a message requesting the user to contact an operator associated with the queue location.

3. The method of claim 2, further comprising:
   receiving, via the user application, a response to the call-in notification within a predetermined response time, the response indicating that the requesting vehicle user is going to the queue location; and
   in response to receiving the response indicating the requesting vehicle user is going to the queue location, creating a second reservation message associated with a different data structure, the different data structure comprising a queue of active user accounts that are available to assist riders at the queue location.

4. The method of claim 3, further comprising:
   monitoring the location of the user device to enter a third geofence; and
   transmitting authorization to the device to allow the vehicle to access the queue location in response to receiving an indication that the location of the user device has entered the third geofence within a predetermined time period after the receiving the response indicating that the requesting vehicle user is going to the queue location.

5. The method of claim 4 further comprising invalidating the reservation message on the different data structure in response to a determination that the user device has not entered the third geofence within the predetermined time period after the receiving the response indicating that the requesting vehicle user is going to the queue location.

6. The method of claim 2 further comprising invalidating the reservation in response to a determination that the user device has not responded in the predetermined time period after the call-in event.

7. The method of claim 6, further comprising automatically generating a report documenting that the user device failed to meet service level requirements.

8. The method of claim 1, after the vehicle has reached the queue location and linked with a rider, monitoring the vehicle in response to leaving a fourth geofence for distance traveled, and when the distance traveled is less than a minimum distance threshold and a time of travel is less than a predetermined threshold, overriding a queue of vehicles at the queue location and sending authorization to the user via the network connection to reenter.

9. The method of claim 1, further comprising tracking data from the application upon reaching the queue location, and using the data to generate an interface.

10. A non-transitory computer readable storage medium having embodied thereon a program, the program being executable by a processor for performing a method comprising:
receiving, via a network connection, a request to join a virtual queue that includes a plurality of user accounts, the request being associated with a requesting user associated with a vehicle, and being received from a user application operating on a user computing device;
determining, in response to receiving the request to join the virtual queue, via a geo-fencing feature, if the user computing device is within a first predetermined distance of a queue location, the queue location being a destination of the requesting user vehicle, the determining further comprising:
receiving a location of the user computing device together with the request to join the virtual queue;
confirming the location of the user computing device is within a far proximity geofence, the far proximity geofence covering an area that includes the first predetermined distance from the queue location; and
confirming that the location of the user computing device is outside of a near proximity geofence that covers an area that includes a second predetermined distance from the queue location, the near proximity being a smaller area than the far proximity geofence, the second predetermined distance being less than the first predetermined distance, the confirmation that the requesting vehicle user is within the first predetermined distance only being provided when the user computing device is also confirmed to be outside of the near proximity geofence and within the far proximity geofence;
automatically creating, in response to receiving confirmation that the requesting vehicle user is within the first predetermined distance, a reservation message associated with the requesting vehicle user;
adding the reservation message to a data structure stored on the server comprising a plurality of reservation messages; and
in response to the creating the reservation message associated with the requesting vehicle user, providing the requesting vehicle user with a notification, via the user application over the network connection, of a position within a queue managed by the data structure, the notification further comprising an estimated wait time generated using information stored within the data structure.

11. The non-transitory computer readable storage medium of claim 10, the method further comprising automatically providing a call-in notification to the user application over the network connection based upon a triggering event taking place after the providing the requesting vehicle user with the notification of the position within the queue, the call-in notification comprising a message requesting the user to contact an operator associated with the queue location.

12. The non-transitory computer readable storage medium of claim 11, the method further comprising:
receiving, via the user application, a response to the call-in notification within a predetermined response time, the response indicating that the requesting vehicle user is going to the queue location; and
in response to receiving the response indicating the requesting vehicle user is going to the queue location, creating a second reservation message associated with a different data structure, the different data structure comprising a queue of active user accounts that are available to assist riders at the queue location.

13. The non-transitory computer readable storage medium of claim 12, the method further comprising:
monitoring the location of the user device to enter a third geofence area; and
transmitting authorization to the device to allow the vehicle to access the queue location in response to receiving an indication that the location of the user device has entered the third geofence area within a predetermined time period after the receiving the response indicating that the requesting vehicle user is going to the queue location.

14. The non-transitory computer readable storage medium of claim 13, the method further comprising invalidating the reservation message on the different data structure in response to a determination that the user device has not entered the third geofence area within the predetermined time period after the receiving the response indicating that the requesting vehicle user is going to the queue location.

15. The non-transitory computer readable storage medium of claim 11, the method further comprising invalidating the reservation in response to a determination that the user device has not responded in the predetermined time period after the call in event.

16. A system comprising:
one or more processors; and
a non-transitory computer-readable medium storing a plurality of instructions, which when executed, cause the one or more processors to:
receive, via a network connection, a request to join a virtual queue that includes a plurality of user accounts, the request being associated with a requesting user associated with a vehicle, and being received from a user application operating on a user computing device;
determine, in response to receiving the request to join the virtual queue, via a geo-fencing feature, if the user computing device is within a first predetermined distance of a queue location, the queue location being a destination of the requesting user vehicle, the determining further comprising:
receiving a location of the user computing device together with the request to join the virtual queue;
confirming the location of the user computing device is within a far proximity geofence, the far proximity geofence covering an area that includes the first predetermined distance from the queue location; and confirming that the location of the user computing device is outside of a near proximity geofence that covers an area that includes a second predetermined distance from the queue location, the near proximity being a smaller area than the far proximity geofence, the second predetermined distance being less than the first predetermined distance, the confirmation that the requesting vehicle user is within the first predetermined distance only being provided when the user computing device is also confirmed to be outside of the near proximity geofence and within the far proximity geofence;

automatically create, in response to receiving confirmation that the requesting vehicle user is within the first predetermined distance, a reservation message associated with the requesting vehicle user;

add the reservation message to a data structure stored on the server comprising a plurality of reservation messages; and in response to the creating the reservation message associated with the requesting vehicle user, provide the requesting vehicle user with a notification, via the user application over the network connection, of a position within a queue managed by the data structure, the notification further comprising an estimated wait time generated using information stored within the data structure.

17. The system of claim 16, the instructions further causing the one or more processors to automatically provide a call-in notification to the user application over the network connection based upon a triggering event taking place after the providing the requesting vehicle user with the notification of the position within the queue, the call-in notification comprising a message requesting the user to contact an operator associated with the queue location.

18. A method for location-based queuing of vehicles, the method comprising:

determining, by a server in response to receiving a request to join a virtual queue, by the server via a geo-fencing feature, if a user computing device is within a first predetermined distance of a queue location, the queue location being a destination of a requesting user vehicle associated with the request to join, the determining further comprising:

receiving a location of the user computing device together with the request to join the virtual queue;

confirming the location of the user computing device is within a far proximity geofence, the far proximity geofence covering an area that includes the first predetermined distance from the queue location; and confirming that the location of the user computing device is outside of a near proximity geofence that covers an area that includes a second predetermined distance from the queue location, the near proximity being a smaller area than the far proximity geofence, the second predetermined distance being less than the first predetermined distance, the confirmation that the requesting vehicle user is within the first predetermined distance only being provided when the user computing device is also confirmed to be outside of the near proximity geofence and within the far proximity geofence;

automatically creating, by the server in response to receiving confirmation that the requesting vehicle user is within the first predetermined distance, a reservation message associated with the requesting vehicle user;

adding, by the server, the reservation message to a data structure stored on the server comprising a plurality of reservation messages;

receiving a call-in request that includes a desired number of vehicles from a queue manager application via a network connection;

in response to receiving the call-in request, identifying a plurality of vehicle users from the data structure, which further includes a virtual queue of previously-received reservations, the previously-received reservations being associated with driver applications having been determined to be within the first predetermined distance of a queue location via the geo-fencing feature, the determination having been made prior to adding the previously-received reservations to the virtual queue;

transmitting a call-in notification to a set of driver applications via the network connection further in response to receiving the vehicle request, each driver application being associated with a reservation within the data structure, the set including the desired number of driver applications;

receiving call-in confirmations over the network connection from the set of driver applications; and in response to receiving each call-in confirmation, transmitting an arrival notification to the transmitting driver application, the arrival notification including a time that the transmitting driver application is expected to reach a third geofenced area associated with the queue location.

19. The method of claim 18, further comprising receiving an arrival notification from one of the set of driver applications, invalidating the reservation when the arrival notification is not received before the time that the transmitting driver application is expected to reach the third geofenced area, and transmitting a check-in request to the queue manager application via the network connection when the arrival notification is received before the time that the transmitting driver application is expected to reach the third geofenced area, the invalidating comprising transmitting a denial notification to the queue manager application including a Service Level Agreement denial message.

20. The method of claim 19, further comprising receiving an authorization, from the queue manager application via the network connection, that the one of the set of driver applications is authorized to enter the queue location, and transmitting the authorization to the one of the set of driver applications via the network connection.

21. The method of claim 18, further comprising receiving an invalidation notification from the queue manager application that one of the set of driver applications has reached the third geofenced area after the time that the transmitting driver application is expected to reach a third geofenced area, and modifying the reservation message to reflect invalidation of the reservation.

22. The method of claim 18, further comprising receiving an override notification from the queue manager application indicating that one of the set of driver applications has reached the third geofenced area after the time that the transmitting driver application is expected to reach a third geofenced area, and modifying the reservation message to reflect that the reservation was honored at the queue location.

23. A computer-implemented method comprising:

determining by a server in response to receiving a request to join a virtual queue by the server via a geo-fencing feature, if a user computing device is within a first predetermined distance of a queue location, the queue location being a destination of a requesting user vehicle associated with the request to join, the determining further comprising:
  receiving a location of the user computing device together with the request to join the virtual queue;
  confirming the location of the user computing device is within a far proximity geofence, the far proximity geofence covering an area that includes the first predetermined distance from the queue location; and
  confirming that the location of the user computing device is outside of a near proximity geofence that covers an area that includes a second predetermined distance from the queue location, the near proximity being a smaller area than the far proximity geofence, the second predetermined distance being less than the first predetermined distance, the confirmation that the requesting vehicle user is within the first predetermined distance only being provided when the user computing device is also confirmed to be outside of the near proximity geofence and within the far proximity geofence;
automatically creating, by the server in response to receiving confirmation that the requesting vehicle user is within the first predetermined distance, a reservation message associated with the requesting vehicle user;
adding, by the server, the reservation message to a data structure stored on the server comprising a plurality of reservation messages;
providing a graphical user interface (GUI) via a virtual queue manager application running on a user computing device, the GUI comprising a list of selectable reservations within the data structure, each reservation being associated with a driver application running on a user computing device and including a status indicator, the selectable reservations being associated with driver applications having been determined to be within the first predetermined distance of a queue location via the geo-fencing feature, the determination having been made prior to adding the previously-received reservations to the data structure;
receiving a selection, on the GUI, of a call-in function;
providing, on the GUI, a call-in interface in response to receiving the selection of the call-in function, the call-in interface having a number prompt capable of receiving a number value associated with a desired number of vehicles associated with the data structure;
receiving a desired vehicle value via the call-in interface, the receiving the desired vehicle value causing the desired vehicle value to be transmitted to a back-end system, the back-end system transmitting call-in notifications to driver applications on the data structure associated with selectable reservations;
providing, in response to the selection of one of the selectable reservations having an invalidated status indicator, a selectable option to override the invalidated status indicator for a vehicle associated with the one of the selectable reservations, where, in response to receiving a selection of the option to override, a message is caused to be transmitted to the back-end system indicating that the vehicle associated with the one of the selectable reservations is allowed entry at the queue location; and
  further in response to receiving the selection of the option to override, a list of selectable reasons to allow entry is displayed on the GUI, where selection of any one of the selectable reasons causes a message to be transmitted to the back-end system indicating that the vehicle associated with the one of the selectable reservations was allowed entry to the queue location for the selected one of the selectable reasons.

24. The computer-implemented method of claim 23, further comprising receiving a selection of one of the selectable reservations via the GUI, displaying a check-in icon associated with the one of the selectable reservations in response to the selection of the one of the selectable reservations, receiving a check-in input associated with the check-in icon via the GUI, and transmitting a check-in message to the back-end system in response to receiving the check-in input.

25. The computer-implemented method of claim 23, further comprising requesting at least one tracked metric from the back-end system, in response to receiving a stats icon selection on the GUI, and displaying, on the GUI, the at least one tracked metric.

26. The computer-implemented method of claim 25, the at least one tracked metric including one or more of a virtual queue status, a queue location status, and a dispatch rate metric.

27. The computer-implemented method of claim 23, the call-in interface further comprising a recommended number of vehicles for the virtual queue based on a time associated with the selection of the call-in function, the recommended number of vehicles being received from the back-end system via the network connection.

28. The computer-implemented method of claim 27, the recommended number of vehicles being received from a prediction engine, the prediction engine being a machine-learning model trained using historical vehicle demand data that outputs a predicted vehicle demand based on a predetermined plurality of input parameters, the input parameters including historical exit rates from the queue location and current vehicle occupancy of the queue location.

29. The computer-implemented method of claim 23, the status indicator for each selectable reservation being one of a waitlist status, an in-transit status, a called status, or a short-trip status.

30. The computer-implemented method of claim 23, further comprising automatically calling, after the receiving the selection of the call-in function, a next reservation on the virtual queue when one or more called-in reservations fails to meet a temporal service level agreement requirement associated with responding to the call-in function.

* * * * *